US012705285B1

(12) United States Patent
Hladik et al.

(10) Patent No.: US 12,705,285 B1
(45) Date of Patent: Aug. 11, 2026

(54) GRAPH SIMILARITY AND ALIGNMENT DETERMINATION

(71) Applicant: SAP SE, Walldorf (DE)

(72) Inventors: Michael Hladik, Walldorf (DE); Jan Portisch, Bruchsal (DE); Christina Di Valentin, Heidelberg (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 19/170,011

(22) Filed: Apr. 3, 2025

(51) Int. Cl.
*G06F 16/901* (2019.01)
*G06F 16/21* (2019.01)
*G06F 16/28* (2019.01)

(52) U.S. Cl.
CPC ........ *G06F 16/9024* (2019.01); *G06F 16/211* (2019.01); *G06F 16/285* (2019.01)

(58) Field of Classification Search
CPC ... G06F 16/9024; G06F 16/211; G06F 16/285
See application file for complete search history.

(56) References Cited

U.S. PATENT DOCUMENTS

2023/0275907 A1* 8/2023 Bertiger .............. H04L 63/1425 726/22
2025/0284711 A1* 9/2025 Cellucci .............. G06F 16/9024

OTHER PUBLICATIONS

Yu, The Future of Knowledge Graph: Will Structured and Semantic Search Become One?, pp. 1-12, Apr. 25, 2024.*
Yu, Enhance Semantic Search of Text Embeddings through Collaborative Filtering over A Knowledge Graph, pp. 1-20 (Year: 2023).*
Yu, Text Embedding—What, Why, and How?, pp. 1-16, (Year: 2023).*
Dijkman, Similarity of business process models: Metrics and evaluation, pp. 498-516 (Year: 2011).*
Understanding Three Fundamental AI Concepts: Embeddings, Vectors, and Kernels, pp. 1-10, Apr. 1, 2025.*

* cited by examiner

*Primary Examiner* — Albert M Phillips, III
(74) *Attorney, Agent, or Firm* — Klarquist Sparkman, LLP

(57) ABSTRACT

A computing system and methods for aligning process graph representations and processing multi-representational datasets are disclosed. A first process graph representation is aligned with a second reference process graph representation using a matcher implemented in a matcher code module. A similarity evaluation is performed at one or more levels of process abstraction, and process-wide metrics are generated to assess overall alignment quality. A user interface renders the metric results and allows user modification of alignment parameters or element correspondences. Additionally, a dataset with at least two representations is processed to generate embedding vectors using different embedding techniques. The embedding vectors are combined into a hybrid vector representation, which is analyzed to determine a similarity measure relative to an input query. Search results are rendered based on the similarity measure. The disclosed techniques improve alignment accuracy, computational efficiency, and the relevance of search results in multi-representational datasets.

20 Claims, 17 Drawing Sheets

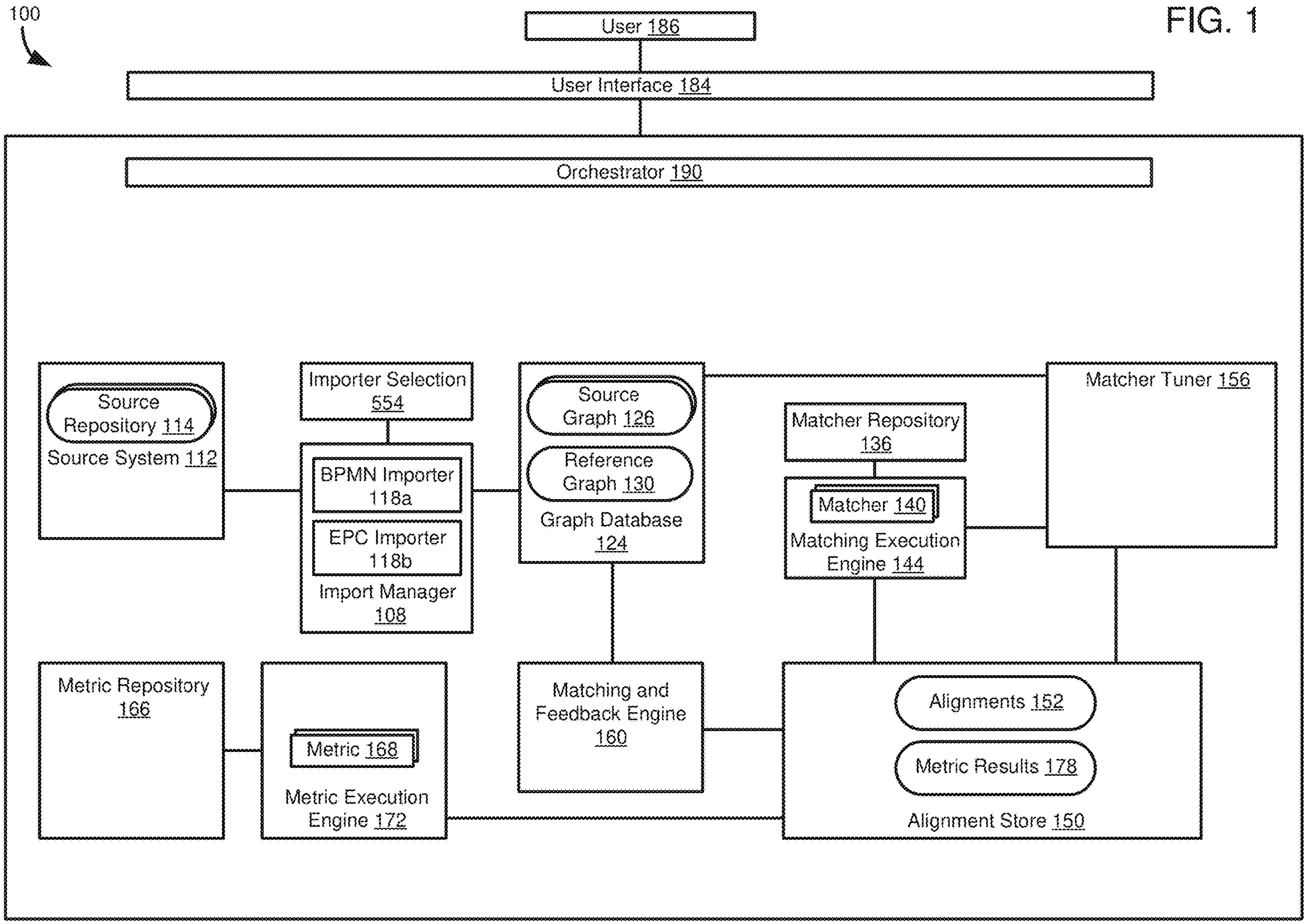
100
User 186
FIG. 1
User Interface 184
Orchestrator 190
Source Repository 114
Source System 112
Importer Selection 554
BPMN Importer 118a
EPC Importer 118b
Import Manager 108
Source Graph 126
Reference Graph 130
Graph Database 124
Matcher Repository 136
Matcher 140
Matching Execution Engine 144
Matcher Tuner 156
Metric Repository 166
Metric 168
Metric Execution Engine 172
Matching and Feedback Engine 160
Alignments 152
Metric Results 178
Alignment Store 150

240

```
@prefix bbo: <http://www.example.org/bbo#> .
@prefix docProcess: <http://www.example.org/docProcess#> .

docProcess:StartEvent_1 a bbo:StartEvent ;
   bbo:name "Submit Document" ;
   bbo:has_targetRef docProcess:AutoReview .

docProcess:AutoReview a bbo:ServiceTask ;
   bbo:name "Automated Compliance Review" ;
   bbo:has_sourceRef docProcess:StartEvent_1 ;
   bbo:has_targetRef docProcess:Decision .

docProcess:Decision a bbo:ExclusiveGateway ;
   bbo:name "Pass Compliance?" ;
   bbo:has_sourceRef docProcess:AutoReview ;
   bbo:has_targetRef docProcess:ReviseDoc ;
   bbo:has_targetRef docProcess:FinalApproval .

docProcess:ReviseDoc a bbo:ManualTask ;
   bbo:name "Manual Review and Revision" ;
   bbo:has_sourceRef docProcess:Decision ;
   bbo:has_targetRef docProcess:FinalApproval .

docProcess:FinalApproval a bbo:ServiceTask ;
   bbo:name "Final Document Approval" ;
   bbo:has_sourceRef docProcess:ReviseDoc ;
   bbo:has_targetRef docProcess:EndEvent_1 .

docProcess:EndEvent_1 a bbo:EndEvent ;
   bbo:name "End Process" ;
   bbo:has_sourceRef docProcess:FinalApproval .
```

FIG. 2C

GRAPH SIMILARITY AND ALIGNMENT DETERMINATION

FIELD

The present disclosure relates to computational techniques for identifying correspondences between structured data representations.

BACKGROUND

In modern enterprise environments, organizations rely on complex business processes that evolve over time due to system upgrades, regulatory changes, and strategic transformations. Aligning these processes with standardized reference models is important for purposes such as providing compatibility between a process and a reference model, optimizing workflows, and facilitating seamless migration to cloud-based systems. However, this alignment is often a manual, resource-intensive effort that requires extensive domain expertise and cross-referencing disparate repositories.

Knowledge graphs provide a powerful framework for structuring and integrating process-related information by representing business activities, dependencies, and decision points as interconnected entities and relationships. They enable advanced analytics, semantic reasoning, and automated process insights. However, determining the degree of alignment between a given business process and a standardized reference model remains a significant challenge, particularly when processes are described using varying levels of granularity, inconsistent terminology, or differing structural conventions.

Existing techniques for process alignment typically rely on direct schema matching or rule-based approaches, which may fail to capture nuanced similarities between processes expressed in different formats. Additionally, these methods often lack scalability and adaptability, requiring extensive manual intervention when new processes or standards emerge. There is a need for improved solutions that can efficiently assess process alignment, quantify deviations, and provide actionable insights to support enterprise transformation initiatives.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A computing system and methods for aligning process graph representations and processing multi-representational datasets are disclosed. A first process graph representation is aligned with a second reference process graph representation using a matcher implemented in a matcher code module. A similarity evaluation is performed at one or more levels of process abstraction, and process-wide metrics are generated to assess overall alignment quality. A user interface renders the metric results and allows user modification of alignment parameters or element correspondences.

Additionally, a dataset with at least two representations is processed to generate embedding vectors using different embedding techniques. The embedding vectors are combined into a hybrid vector representation, which is analyzed to determine a similarity measure relative to an input query. Search results are rendered based on the similarity measure. The disclosed techniques improve alignment accuracy, computational efficiency, and the relevance of search results in multi-representational datasets.

In one aspect, the present disclosure provides a process for aligning and analyzing process graph representations. A first process graph representation is received, where the first process graph representation defines a plurality of process elements and relationships between the plurality of process elements. A second process graph representation is received, where the second process graph representation defines a plurality of reference process elements and relationships between the plurality of reference process elements.

An alignment between the first process graph representation and the second process graph representation is determined using at least one matcher implemented in a first matcher code module. The alignment associates process elements of the first process graph representation with reference process elements of the second process graph representation based on a similarity evaluation, where the similarity evaluation is performed at one or more levels of process abstraction.

The alignment is analyzed using at least one process-wide metric implemented in a first metric code module to generate first metric results. The at least one process-wide metric is distinct from similarity evaluations performed at an element level and is computed based on aggregated characteristics of the determined alignment across multiple process elements. The at least one process-wide metric evaluates the alignment across an entirety of the first process graph representation and the second process graph representation, rather than individual element correspondences.

The first metric results are rendered for display via a first user interface. The first metric results include at least a process-wide alignment score indicative of an overall similarity between the first process graph representation and the second process graph representation.

At least one alignment parameter is modified based on first user interaction with the displayed first metric results. Alternatively, an alignment between an element of the first process graph representation and an element of the second process graph representation is modified based on second user interaction with the displayed first metric results.

In another aspect, the present disclosure provides a process for generating and processing embedding vectors from multiple dataset representations. A dataset is received, where the dataset includes a plurality of data elements and has at least a first representation and a second representation. The first representation conveys a first type of semantic information about the dataset, and the second representation conveys a second type of semantic information about the dataset that differs from the first type.

A first embedding vector is generated from the first representation using a first embedding technique. A second embedding vector is generated from the second representation using a second embedding technique that is different from the first embedding technique.

The first embedding vector and the second embedding vector are combined to generate a combined embedding vector. The combined embedding vector is processed at to determine a similarity measure between the dataset and an input embedding vector corresponding to a search query.

Search results are returned in response to the search query based on the similarity measure.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 1 is a diagram illustrating an example computing environment in which disclosed graph matching techniques can be implemented.

FIG. 2C provides RDF triples determined from the computer-readable description of FIG. 2B.

DETAILED DESCRIPTION

Example 1)—Overview

Figure 2A:
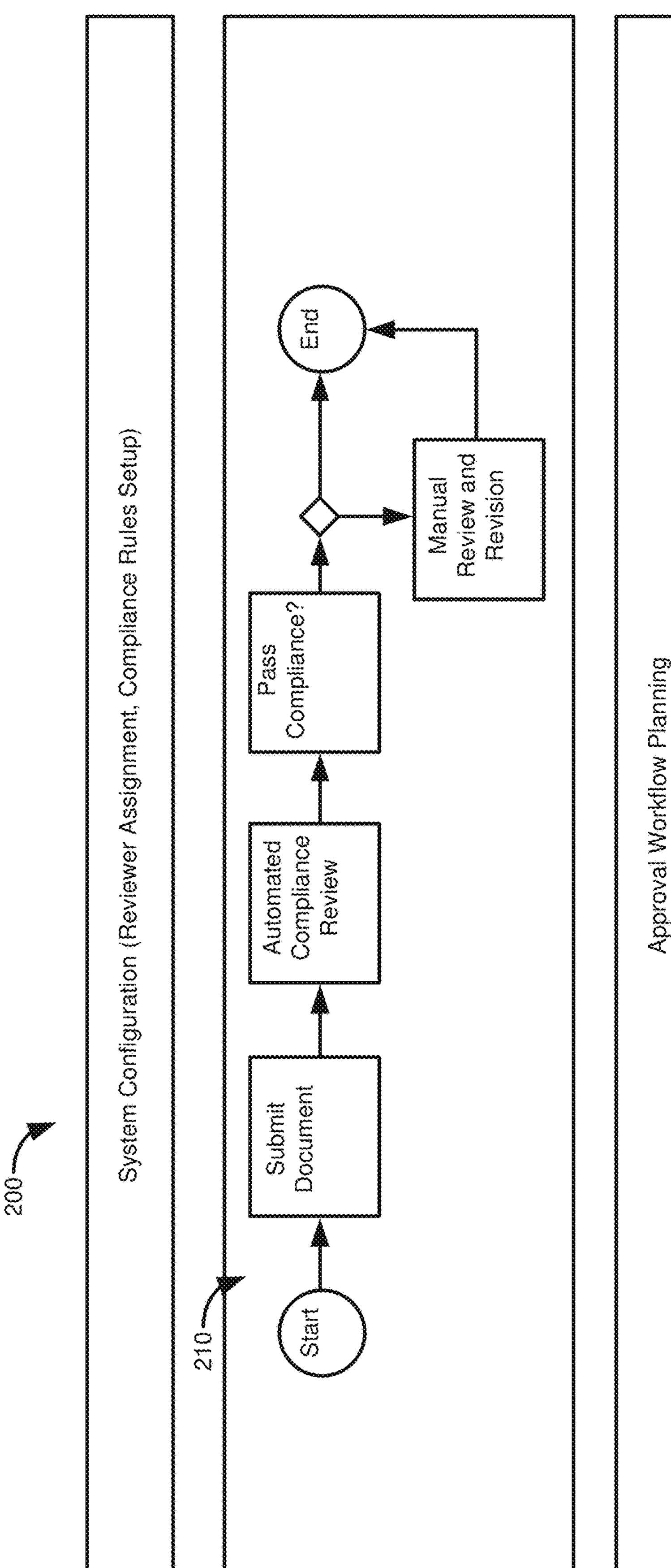
FIG. 2A is an example process flow diagram.

Building on the background, the present disclosure provides techniques for evaluating alignment between structured process representations and standardized reference models using scalable, automated matching techniques. Organizations undergoing digital transformation often have a need to reconcile existing business processes with predefined frameworks to facilitate cloud migration, regulatory compliance, and operational efficiency. However, process mapping is traditionally a labor-intensive task requiring extensive manual review of disparate process repositories. The disclosed techniques introduce automated solutions that improve computational efficiency and reduce manual effort compared to conventional methods.

To address process alignment challenges, the disclosed techniques enable multiple approaches to process matching, which can be applied independently or in combination. One approach builds on conventional schema and graph-based matching techniques, using predefined structural relationships and rule-based entity correspondences. This method is well-suited for structured environments where process elements follow consistent schemas, allowing for alignment through deterministic or probabilistic models.

The disclosed techniques further introduce an enhanced alignment approach that integrates multiple sources of information into a unified matching framework. Unlike conventional techniques that rely solely on explicit schema mappings or direct entity correspondences, this approach incorporates structural relationships, semantic context, and contextual dependencies to refine alignment decisions. In one implementation, this is achieved by transforming structured process representations into vector-based encodings that enable flexible similarity evaluations, even when process descriptions vary in terminology or structure. However, the disclosed techniques are not limited to embedding-based methods and may incorporate alternative fusion-based techniques that optimize alignment by integrating diverse feature representations.

These methods are not necessarily dependent on one another; either approach may be used independently, depending on system requirements, computational constraints, or the characteristics of the processes being compared. However, in some implementations, they may be used together in a hybrid model to refine alignment accuracy and reduce false positives. By dynamically incorporating both structured relationships and contextualized representations, the disclosed techniques improve robustness across different enterprise environments.

The disclosed techniques further provide computational efficiency improvements beyond reducing manual effort. While process alignment typically involves pairwise comparisons between process elements, the disclosed techniques optimize these operations by leveraging targeted subgraph identification, dimensionality reduction, and optimized similarity search techniques. Rather than relying solely on exhaustive graph traversal, which can become computationally expensive at scale, the disclosed techniques transform process representations into a computationally efficient format, reducing the overhead associated with large-scale process alignment.

Further efficiency improvements are realized through selective matching and feedback-driven refinement. Unlike conventional schema-matching systems that compare every element of a process representation against all possible counterparts, the disclosed techniques enable focused alignment by segmenting process graphs into more manageable subcomponents before comparison. Additionally, by incorporating user feedback, the system avoids unnecessary recomputation of previously validated alignments, focusing computational resources on refining areas of uncertainty rather than recalculating the full set of correspondences.

Beyond computational efficiency, the disclosed techniques provide technical advantages that improve the practical applicability of process alignment solutions. By supporting multiple alignment strategies—including schema-based, structural, and semantic-based approaches—the system can adapt to different enterprise environments without requiring extensive customization. The ability to quantify alignment using similarity metrics also provides a structured framework for evaluating transformation readiness and tracking deviations over time. This allows organizations to make data-driven decisions regarding process standardization, prioritizing migration efforts based on objective measures of conformance to reference models.

By reducing unnecessary exhaustive comparisons, leveraging optimized search techniques, and incorporating feedback-driven refinement, the disclosed techniques provide concrete technical benefits beyond automating a manual process. These improvements enhance the efficiency of process alignment operations, making them feasible for large-scale enterprise applications while optimizing the use of computing resources.

Example 2)—Example Computing Environment Facilitating Graph Alignment and Metric Determination The computing environment 100 includes an import manager 108 that is configured to obtain process representations from a source repository 114 of a source system 112. The import manager 108 facilitates the transformation of process data from various formats into a standardized graph-based or other representation suitable for automated analysis. The source repository 112 can include process models stored in structured formats, such as BPMN (Business Process Model and Notation) or EPC (Event-driven Process Chain), as well as semi-structured or unstructured representations, such as XML-based workflows or text-based process descriptions.

The import manager 108 includes, or is otherwise able to access, one or multiple importers 118 (shown as 118*a*, 118*b*), each designed to handle a specific input format. For example, importer 118*a* is configured to generate graph-based representations of processes expressed in BPMN, while importer 118*b* is configured to generate graph-based representations of processes expressed in EPC.

FIG. 2A provides an example process flow 200, in a graphical format, that can be represented in BPMN, EPC, or another format. A process 210 of the process flow 200 includes various operations, such as when a document is submitted for compliance review, compliance review is initiated, and then various actions are taken depending on whether or not the document was determined to be compliant.

Figure 2B:
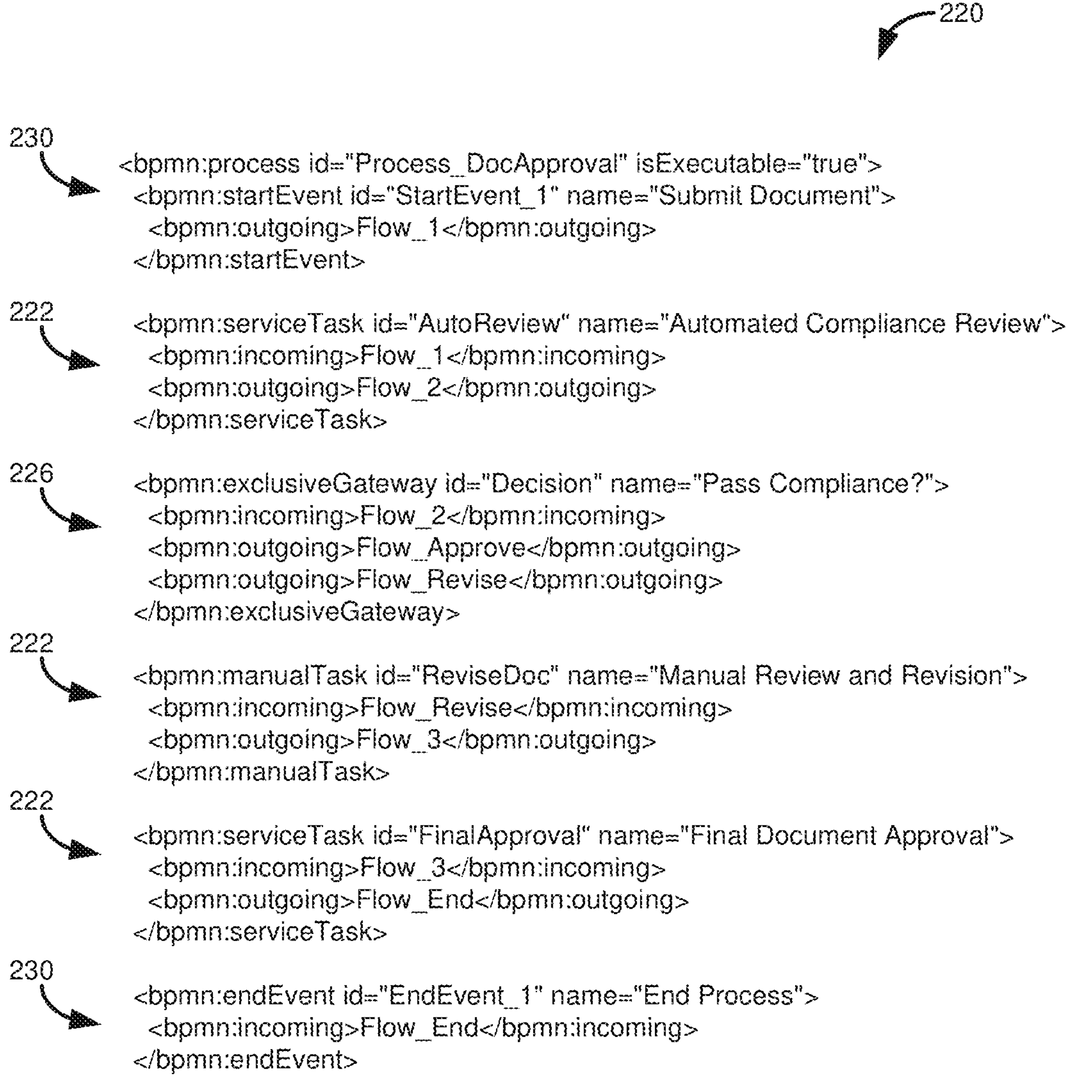
FIG. 2B provides a computer-readable description of the process flow diagram of FIG. 2A.

FIG. 2B provides a BPMN representation 220 of the process 210. For structured process models, an importer parses the process definition and extracts key elements, such as activities, transitions, decision points, and dependencies. As shown in FIG. 2A, a BPMN-based workflow consists of interconnected process elements, including tasks, gateways, and events, each defined in a computer readable format, such as using standard BPMN XML elements, shown in the BPMN representation 220. The BPMN importer 118*a* of FIG. 1 processes this representation 220 by using a BPMN-compliant parser to extract each activity node 222, decision gateway 226, and event node 230. Each extracted element is assigned a unique identifier, which is preserved when the workflow is transformed into a graph-based structure.

Once extracted, the parsed BPMN representation is converted into a suitable representation. In one implementation, the BPMN representation 220 is converted into an RDF-based knowledge graph representation 240, as illustrated in FIG. 2C. The transformation process maps BPMN elements 222-230 to corresponding RDF triples using predefined ontologies, such as the BPMN Ontology or the Business Process Ontology. These ontologies define relationships between tasks, dependencies, and decision nodes, ensuring that the resulting graph structure maintains both syntactic and semantic integrity. By structuring process data as an RDF graph, the system enables process relationships to be queried and analyzed using semantic reasoning techniques.

For semi-structured and unstructured process descriptions, an importer 118 of the import manager 108 applies natural language processing (NLP) techniques to extract process elements. Unlike structured models, where relationships are explicitly defined in BPMN or EPC diagrams, text-based descriptions often lack explicit structural relationships, requiring the system to infer dependencies. The importer 118 tokenizes process descriptions, identifying process-related terms such as activity names, roles, and dependencies. Named entity recognition (NER) models classify extracted terms into predefined categories, such as "Approval Task," "Compliance Check," or "Manual Review," based on domain-specific training data.

A dependency parser then analyzes sentence structure to infer relationships between extracted elements, reconstructing the implicit workflow structure from text. These extracted elements are mapped into an RDF knowledge graph using a standardized ontology to provide consistency with structured process models.

Once transformed, the process representations are stored in a source graph 126, which maintains structured representations of customer processes. The source graph 126 is stored within a graph database 124, which provides efficient access to process representations using graph-based querying mechanisms. The graph database 124 supports standard graph query languages, such as SPARQL, enabling retrieval of process structures, activity relationships, and hierarchical dependencies based on semantic relationships. Unlike traditional relational databases, which use predefined table structures, the graph database 124 dynamically links process elements based on inferred relationships, enabling recursive dependency analysis and graph traversal techniques for querying complex process flows.

The graph database 124 also supports semantic reasoning mechanisms that allow for the inference of implicit relationships within the process data. For example, if a customer's process includes an activity labeled "invoice processing", and a reference graph 130 includes an activity labeled "customer invoicing", the graph database 124 can infer a potential match based on semantic similarity and contextual relationships, even if a direct structural relationship does not exist. This capability is particularly valuable in aligning processes that may differ in terminology but are functionally equivalent. In addition to storing the source graph 126, the graph database 124 also maintains the reference graph 130, which can represent a standardized process model, or more generally a model to which the source graph 126 is to be compared.

In addition, or alternatively, to directly storing process representations in the graph database 124, disclosed techniques can be implemented using alternative RDF (or other graph representation) storage architectures depending on performance, scalability, and integration requirements. In some implementations, RDF triples representing process elements may be stored within a relational database rather than a native graph database. Relational RDF stores maintain process relationships in a structured format, where each process node, transition, and dependency is stored as a set of subject-predicate-object triples within a relational schema. Using this approach, SPARQL queries can be translated into SQL operations, allowing compatibility with existing relational database management systems (RDBMS).

In another implementation, a hybrid approach may be used in which process data is stored in a relational database but transformed into a graph representation at query time for analysis. This allows organizations to leverage the transactional consistency and indexing efficiency of relational databases while still taking advantage of the semantic reasoning and flexible querying capabilities of graph databases when performing alignment operations. The system may also support dedicated RDF triple stores, which are optimized for processing knowledge graphs within relational architectures.

The computing environment 100 includes a matcher repository 136, which provides access to a collection of available matching techniques that can be used to align process graph structures, including graphs or subgraphs corresponding to process representations stored in the source graph 126 with representations in the reference graph 130. The matcher repository 136 allows for the selection and configuration of process alignment operations by enabling the use of different matching techniques, each optimized for different data structures, business domains, or computational constraints. In some implementations, matchers 140 stored in the matcher repository 136 adhere to a predefined matcher interface, so that each matcher is compatible with a matching execution engine 144.

A matcher 140 can be implemented using a matcher code module. A matcher code module refers to a software- or hardware-implemented computational component that performs similarity evaluations between data elements or process elements in accordance with a defined matching technique. A matcher code module can include computer-executable instructions, configuration parameters, or algorithmic logic that enables a computing system to compare structured or unstructured representations of data.

A matcher code module can be fully encoded as a software implementation (e.g., a function, class, or standalone executable) or can be dynamically configurable, where matching logic is determined based on external configuration files, user input, or machine-learned parameters. In some implementations, a matcher code module may be implemented as a hybrid system that combines predefined rule-based matching logic with embedding-based or machine learning-driven similarity assessments.

A matcher code module may be natively executed on a general-purpose processor or accelerated using specialized hardware, such as field-programmable gate arrays (FPGAs), application-specific integrated circuits (ASICs), or dedicated similarity search processors. The execution of a matcher code module may involve schema-based comparisons, graph-based alignment techniques, embedding similarity computations, probabilistic reasoning, or other structured or unstructured data matching methodologies.

The matching execution engine 144 retrieves process representations from the source graph 126 and reference graph 130, applies the selected matcher 140, and generates proposed alignments. The matching execution engine 144 supports schema-based matching approaches, embedding-based similarity models, and hybrid matchers that combine multiple alignment strategies. Schema-based matchers rely on graph topology, entity relationships, and schema correspondences, identifying direct process element mappings when consistent labeling and dependencies exist. Embedding-based matchers use vector representations of process descriptions, allowing for similarity-based alignment even when process elements differ in terminology or format. Hybrid matchers may dynamically integrate both approaches to balance structural and semantic alignment accuracy.

The matcher repository 136 is designed for extensibility, allowing additional matchers 140 to be registered and integrated into the computing environment 100. Each matcher 140 stored in the matcher repository 136 is programmed according to a standardized matcher interface, which defines the expected inputs, outputs, and execution logic required by the matching execution engine 144. In some implementations, matchers in the repository 136 may be dynamically updated, optimized, or tuned based on historical alignment performance.

Once a matching operation is performed, the resulting process alignments 152 are stored in an alignment store 150. The alignment store 150 maintains records of established correspondences between process elements, providing a persistent mapping that can be reviewed, refined, or updated as necessary. Alignments 152 stored in the alignment store 150 can be used for incremental refinement, allowing newly processed workflows to be evaluated against previously matched processes without requiring full recomputation of historical alignments.

To improve alignment accuracy over time, a matcher tuner 156 dynamically optimizes match configurations based on historical performance. The matcher tuner 156 evaluates past alignments, identifies patterns in validated matches, and adjusts matching parameters accordingly. If prior alignments 152 indicate systematic biases—such as recurring misalignments due to inconsistent terminology conventions—the matcher tuner 156 can adapt similarity thresholds, modify feature weighting, or apply additional pre-processing techniques to improve accuracy.

A matching feedback engine 160 allows validated alignments 152 to be used by the matcher tuner 156. Once alignments 152 are generated and stored in the alignment store 150, users can review match results and accept, reject, or modify individual correspondences. Accepted matches reinforce existing alignment patterns, while rejected matches provide corrective signals that guide future refinements. The matching feedback engine 160 automatically updates the system's matchers 140 based on user interactions. This feedback-driven learning process reduces manual intervention over time as matchers 140 progressively improve their accuracy.

The computing environment 100 includes a metric repository 166, which provides access to a collection of predefined and configurable metrics 168, and their associated calculations or algorithms (implemented by computing code or other computer-executable instructions) that assess the alignment quality between processes in the source graph 126 and those in the reference graph 130. The metric repository 166 allows for the selection of different alignment evaluation methods, allowing organizations to analyze similarity across various dimensions, such as structural consistency, semantic similarity, and transformation impact. In an implementation, metrics 168 in the metric repository 166 adhere to a standardized interface, so that they are compatible with a metric execution engine 172.

The metric execution engine 172 is responsible for computing similarity metrics 168 based on process alignments 152 stored in the alignment store 150. The metric execution engine 172 retrieves the aligned process elements, applies the selected metric computations, and generates similarity scores, in the form of metric results 178 of the alignment store 150. These scores provide insights into the degree of process standardization, allowing organizations to assess how closely customer workflows align with best-practice models. In some implementations, threshold-based scoring may be used to classify process alignments into categories such as fully aligned, partially aligned, or non-aligned. The system may also support weighting factors, enabling organizations to prioritize certain types of similarity, such as structural versus semantic, depending on business objectives. The metric results 178 also facilitate trend-based reporting, supporting dashboards and analytics that visualize the progress of business process standardization efforts.

Various types of metrics 168 can be used, including process similarity metrics that measure the alignment of entire processes based on direct correspondences, activity-level similarity that compares individual tasks and decision points between the source and reference graphs, structural alignment metrics that evaluate graph topology by analyzing the sequence and dependencies of activities, semantic similarity metrics that use natural language processing embeddings to quantify textual similarity between process descriptions, and global transformation metrics that aggregate similarity scores across multiple processes to assess overall alignment trends.

The computing environment 100 includes a user interface 184 that provides an interactive platform for users 186 to review, configure, and refine process alignment operations. The user interface 184 facilitates user engagement with various components of the computing environment 100, allowing for the validation of alignment results, refinement of matcher configurations, and visualization of process similarity metrics. Through the user interface 184, users 186 can access process alignment results 152 stored in the alignment store 150 and review similarity assessments generated by the metric execution engine 172. The user interface 184 can allow users 186 to navigate between individual process elements, explore alignment correspondences, and inspect the reasoning behind similarity calculations.

The user interface 184 also supports user feedback integration through the matching feedback engine 160. After an alignment operation is performed, users 186 can accept, reject, or modify individual correspondences, allowing validated matches to contribute to future refinement of the matchers 140. Users 186 can also configure specific matchers 140 for use by the matching execution engine 144 by selecting available matchers from the matcher repository 136, allowing for adjustments based on the specific requirements of a given process analysis task. Additionally, users 186 can define evaluation criteria by selecting available metrics 168 from the metric repository 166, enabling the customization of similarity assessments based on specific objectives. The user interface 186 further supports trend analysis by allowing users to view historical metric results 178 stored in the alignment store 150, facilitating the tracking of process transformation progress over time.

The computing environment 100 also includes an orchestrator 190, which manages execution flow across components of the computing environment. The orchestrator 190 coordinates data retrieval from the source repository 114, the source graph 126, and the reference graph 130. The orchestrator 190 directs the sequence of operations, triggering the execution of the matching execution engine 144 to generate initial process alignments 152, followed by the invocation of the metric execution engine 172 to compute similarity metric results 178.

Example 3)—Example Matchers

As explained with respect to FIG. 1, the computing environment 100 performs process alignment by comparing process elements in a source graph 126 with standardized workflows in a reference graph 130. This alignment process enables organizations to assess similarities between processes, such as business processes, evaluate transformation readiness, and refine process standardization efforts. To accomplish this, disclosed techniques can use various matching techniques, including those that operate at multiple levels of process abstraction.

Matching operations can be performed at multiple levels of process abstraction to provide fine-grained and high-level assessments of similarity. At the process level, the system evaluates entire workflows to determine whether a customer's business process corresponds to a predefined reference process. This level of matching considers process structure, execution sequences, and dependencies between activities.

At the activity level, individual process steps, such as tasks, decision points, and service calls, are compared. Activity-level matching identifies partial correspondences between processes, even when overall workflows do not align exactly. At the schema-level semantic context, the system aligns process metadata, mapping structured attributes that define how a process or activity is categorized. For example, if a customer process refers to a system as an "ERP Instance," while a reference process labels it as a "Deployment Environment," schema-level matching helps establish equivalence between these terms.

At the semantic context instance level, the system evaluates business objectives and operational intent. This level of matching is particularly useful for aligning strategic goals, such as determining whether a process labeled "Reduce IT Cost" corresponds to a reference model describing "Optimize IT Expenditure."

To facilitate process alignment, process elements in the source graph 126 and reference graph 130 are represented using a structured graph format, where nodes represent discrete process components and edges define relationships between them. Each node may include attributes that describe process execution constraints, metadata categories, and dependency structures. By structuring process data in this format, the disclosed techniques enable graph-based retrieval and matching operations. The graph model supports both direct node-to-node alignment and more complex, context-aware comparisons that analyze multiple relationships simultaneously.

To improve flexibility, the disclosed techniques support multiple matching approaches, which may be used alone or in combination. Some approaches use predefined mappings and schema-based constraints, while others use probabilistic inference, machine learning models, or embedding-based techniques to establish relationships dynamically.

A machine learning-based matcher may be trained on historical alignment data to improve performance over time, while an embedding-based matcher encodes process elements into vectorized representations that enable flexible similarity calculations. A hybrid embedding technique, described further with reference to FIG. 3, combines different types of embeddings to create a unified vector representation that captures both structural and textual relationships within process elements.

In one approach, a schema-based matcher aligns process components based on explicit entity relationships. Each process model is mapped to a reference model, where entity relationships are predefined. This approach enforces structural consistency and deterministic mappings, making it particularly useful in environments with strict process conventions. The schema-based matcher operates using direct entity correspondences, rule-based heuristics, and hierarchical dependency resolution to establish relationships between process elements.

A probabilistic matcher evaluates relationships dynamically using learned patterns and inference techniques rather than relying solely on predefined mappings. Process elements are first aligned with a common schema, forming subgraphs that establish baseline correspondences. The matcher then extends these correspondences using probabilistic reasoning, assessing the likelihood that specific process elements should be mapped based on structural similarity, contextual features, and historical alignments. By incorporating training data that includes validated matches, this approach improves over time, allowing it to handle cases where schema mappings are incomplete or entirely unavailable.

A machine learning-based matcher can be trained using historical alignment data to improve accuracy. Training involves learning embedding relationships, dependency structures, and similarity patterns that enable the matcher to generalize alignments to previously unseen data. For example, if prior alignments indicate that "customer.name" frequently aligns with "client.fullName," the matcher may infer that similar mappings should apply in other contexts, even when process labels differ. Once trained, the matcher evaluates new process alignments using a combination of semantic embeddings and learned similarity functions, dynamically adjusting confidence scores based on prior training data.

An embedding-based matcher performs alignment based on semantic meaning rather than explicit mappings. This method transforms process descriptions into numerical representations using models such as SBERT (Sentence-BERT) and RDF2Vec, allowing for flexible, context-aware comparisons. Unlike rule-based schema matching, which relies on predefined relationships, this approach generalizes across diverse datasets and process variations, making it particularly useful when process terminology differs across organizations. Once embeddings are generated, dimensionality reduction techniques, such as Principal Component Analysis (PCA), may be applied to optimize similarity computations. The matcher then applies distance metrics, such as cosine similarity or approximate nearest-neighbor search, to determine which process elements are most likely to align.

A graph neural network (GNN)-based matcher leverages graph representation learning to align processes based on their structural and contextual relationships. Instead of relying solely on direct entity mappings, this matcher propagates learned features across graph nodes, enabling the system to identify complex dependencies between process elements. This approach is particularly beneficial when process structures contain hierarchical relationships or deep interdependencies, such as in multi-layered approval workflows or supply chain coordination processes.

A fuzzy text matching matcher applies approximate string matching techniques to align process elements that contain minor textual variations. Using methods such as Levenshtein distance, token-based similarity, and phonetic encoding, this matcher helps identify process activities with similar intent but slightly different wording. This approach is particularly useful when process descriptions are generated from multiple sources or contain human-introduced inconsistencies.

An ontology-aware matcher incorporates domain-specific knowledge models to refine process alignment. This matcher uses industry-standard taxonomies, semantic hierarchies, and business logic to improve accuracy when mapping specialized process components. For example, if a process in a financial institution refers to "KYC Verification" and another references "Customer Due Diligence," the ontology-aware matcher can identify these as equivalent based on a shared compliance framework.

A time-series matcher is designed for aligning version-controlled processes that evolve over time. This matcher evaluates historical process execution patterns, version updates, and structural modifications to determine how a process has changed. By comparing time-stamped process variations, the matcher provides alignments that are not only structurally correct but also reflect the correct process version in dynamic environments such as regulatory compliance tracking or evolving IT workflows.

A hybrid embedding-based matcher, as further described with reference to FIG. 3, refines the embedding-based approach by integrating multiple sources of information into a unified vector representation. Instead of treating process elements as isolated entities, this method combines textual embeddings with structural embeddings to produce a hybrid vector representation that captures both semantic meaning and contextual dependencies. This refined approach improves the accuracy and robustness of alignment operations, particularly in scenarios where semantic similarity alone is insufficient, and structural information enhances matching accuracy.

As noted above, the disclosed techniques support matching at multiple levels of process abstraction. For process-level matching, entire workflows are compared based on functional similarity. As an example, a customer organization may have a "Customer Order Management" workflow, while the reference model provides an "ERP-based Order Fulfillment" process. The workflows have structural differences but serve the same overall purpose. A structured representation of these workflows before embedding is:

```
{
  "process_id": "cust_order_mgmt",
  "process_name": "Customer Order Management",
  "activities": ["Receive Order", "Validate Order", "Generate Invoice", "Ship Product" ],
  "metadata": {
    "category": "Sales",
    "system": "CRM"
  }
}
```

In a specific implementation, computer-based representations of these processes are verbalized into textual descriptions, and embeddings are computed using SBERT. The following code generates embeddings for process descriptions and computes similarity:

```
from sentence_transformers import SentenceTransformer
from sklearn.metrics.pairwise import cosine_similarity
model=SentenceTransformer('all-mpnet-base-v2')
process_1_desc="Customer Order Management: Receive
  Order, Validate Order, Generate Invoice, Ship Product"
process_2_desc="Order Fulfillment Process: Receive
  Customer Request, Approve Order, Issue Invoice, Dispatch Goods"
embedding_1=model.encode(process_1_desc)
embedding_2=model.encode(process_2_desc)
similarity_score=cosine_similarity([embedding_1], [embedding_2])[0][0]
print(f"Process similarity: {similarity_score:.4f}")
```

This process computes a similarity score, indicating whether the two workflows are functionally equivalent despite variations in structure. Higher similarity scores suggest closer functional alignment, while lower scores indicate greater divergence in process execution.

At the activity level, individual steps within a process are matched based on functional similarity. A customer process may contain an activity labeled "Generate Invoice," while the reference model defines a similar activity as "Create Billing Record." These activities serve equivalent functions but are labeled differently. Using embeddings, the matcher can align them based on semantic equivalence. The following example demonstrates activity-level similarity matching:

```
activity_1=model.encode("Generate Invoice")
activity_2=model.encode("Create Billing Record")
similarity_score=cosine_similarity([activity_1], [activity_2])[0][0]
print(f"Activity similarity: {similarity_score:.4f}")
```

At the schema-level semantic context, process metadata is aligned to determine consistency across structured attributes. For instance, a customer process may use the term "ERP Instance," while a reference process refers to the same concept as "Deployment Environment." The system recognizes that these terms are related, allowing metadata properties to be aligned. Example metadata schema mapping is:

```
{
  "customer_process": {
    "metadata_id": "erp_instance",
    "label": "ERP Instance"
  },
  "reference_process": {
    "metadata_id": "deployment_env",
    "label": "Deployment Environment"
  }
}
```

Using embeddings, the system identifies these concepts as similar. The following computation demonstrates this alignment:

```
meta_1=model.encode("ERP Instance")
meta_2=model.encode("Deployment Environment")
similarity_score=cosine_similarity([meta_1], [meta_2])[0][0]
print(f"Metadata similarity: {similarity_score:.4f}")
```

At the instance-level semantic context, the system evaluates high-level business objectives. A customer process may define a goal as "Reduce IT Cost," while the reference model expresses a similar intent as "Optimize IT Expenditure." Although the terminology differs, embedding-based matching determines that these business intents align. The following example demonstrates instance-level similarity matching:

```
intent_1=model.encode("Reduce IT Cost")
intent_2=model.encode("Optimize IT Expenditure")
similarity_score=cosine_similarity([intent_1], [intent_2])[0][0]
print(f"Intent similarity: {similarity_score:.4f}")
```

Figure 3:
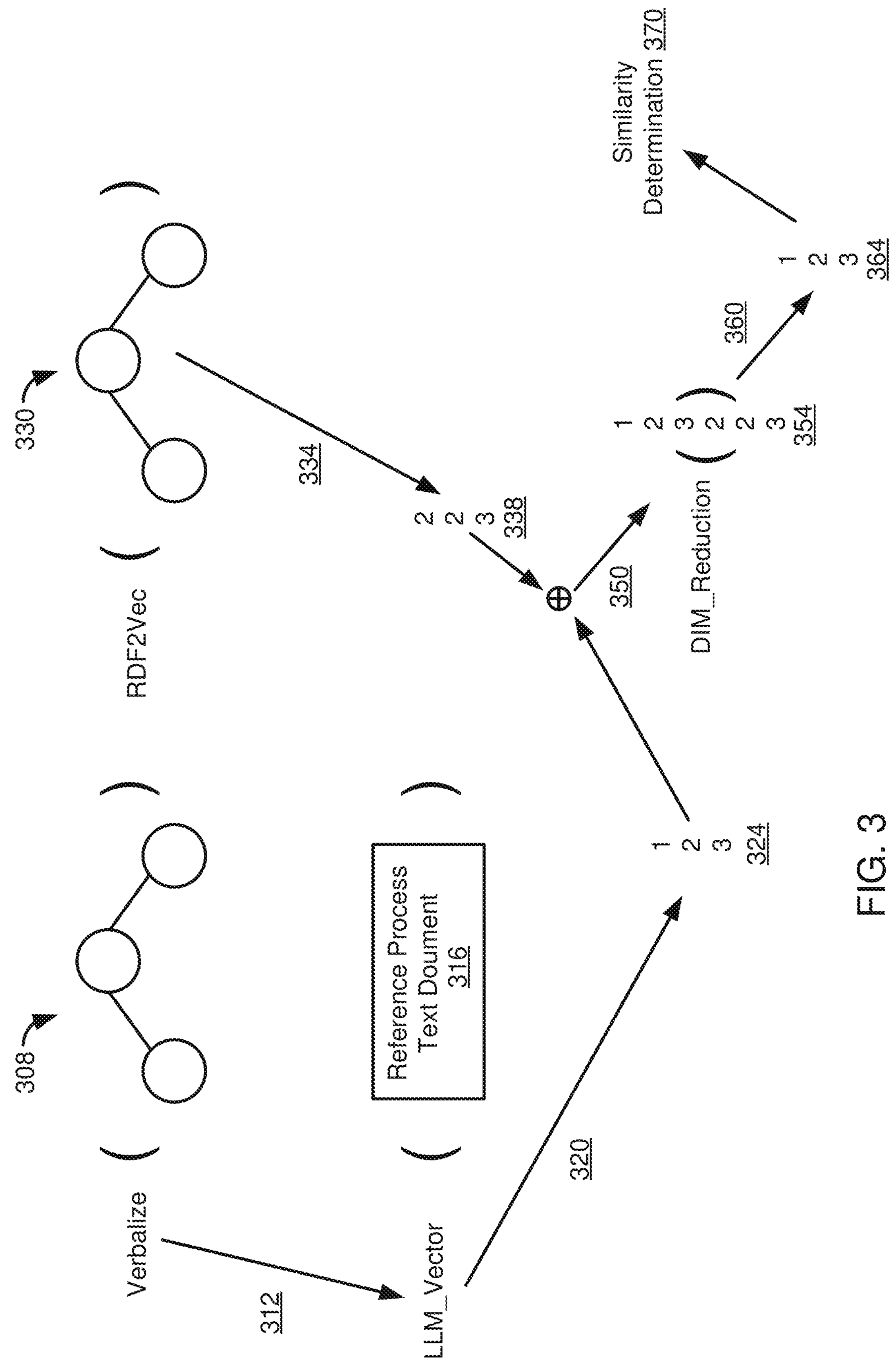
FIG. 3 is a diagram of a process of generating a hybrid embedding vector that can be used in graph alignment.

FIG. 3 illustrates a refinement of embedding-based approaches that use a hybrid vector representation to enhance alignment accuracy. Rather than relying solely on textual or structural embeddings, multiple embeddings are generated for each process element and merged into a single hybrid vector. This approach captures both the semantic meaning of textual process descriptions and the structural relationships present in graph-based process models. By integrating these distinct embedding types, the system improves matching performance, particularly in cases where process terminology and structure vary between datasets. This hybrid representation allows for more robust similarity calculations, particularly when textual descriptions alone do not capture process relationships or where structural graph representations lack semantic depth.

While the following discussion describes particular types of vectors that can be combined, this technique can be applied more generally to combine two or more embeddings that capture different characteristics of process elements, allowing for a more holistic alignment determination. This hybrid method provides increased flexibility by incorporating both semantic and structural elements into the alignment process.

Unlike earlier embedding-based matchers that process entities in isolation, this approach combines two different types of vector representations: a graph-wide embedding derived from verbalized process elements and a parent node embedding that provides higher-level structural context. This allows similarity calculations to account for both textual semantics and hierarchical process organization.

More generally, hybrid vector embeddings can be used to capture multiple styles of semantic information As used herein, "semantic information" refers to data that conveys meaning, context, or relationships beyond purely structural, numerical, or syntactic representations. Semantic information can describe what an entity is, its attributes, its function, or its connections to other entities, rather than just defining its structural format.

In contrast to purely structural data, which encodes format, hierarchy, or relational positioning, semantic information provides contextual and descriptive meaning that helps interpret the data's significance. For example, in a business process model, semantic information may include process descriptions, activity labels, and role assignments (e.g., "Approve Loan Application" describes an activity, while "Loan Officer" represents an assigned role).

In a knowledge graph, semantic information may consist of entity relationships (e.g., "Company A acquired Company B"), descriptive attributes (e.g., "The Eiffel Tower is a landmark in Paris"), or categorization (e.g., "Car is a type of Vehicle"). In a database schema, semantic information could include column names and descriptions that describe stored values (e.g., a table column labeled "Customer Loyalty Score" conveys more meaning than a generic "Score" field).

In natural language text, semantic information is implicit and derived from word meanings and sentence structure, such as understanding that "Apple" in "Apple releases new iPhone" refers to a company, whereas "Apple" in "I ate an apple" refers to a fruit. In image and multimedia processing, semantic information may describe what an image represents rather than just its pixel structure, such as labeling an image as "A dog playing in a park" rather than simply storing its raw visual data. In machine learning models, embeddings derived from semantic representations capture word associations, topic similarities, or conceptual meanings (e.g., embeddings trained on text may recognize that "doctor" is more closely related to "hospital" than to "ocean"). Semantic information may also be inferred from hierarchical classifications, such as understanding that "sedan" is a subclass of "car," which is a subclass of "vehicle." The presence of semantic information allows computational techniques to evaluate meaning-based similarities rather than merely comparing raw structure, syntax, or numeric values.

In addition to descriptive semantic information, which provides intrinsic meaning about an entity, another category of semantic information is relational semantic information. Relational semantic information describes how entities or data elements are connected, providing context through interdependencies, dependencies, and associations. Rather than simply describing an entity in isolation, this type of semantic information derives meaning from relationships between multiple data elements.

For example, in a business process graph, a task's semantic meaning is influenced by its position within the workflow (e.g., "Generate Invoice" following "Validate Order" indicates a financial process sequence). In a knowledge graph, relational semantic information may be expressed through triples (subject-predicate-object), such as ("Paris is the capital of France"), where "is the capital of" defines the relationship. In a database schema, foreign key relationships define logical connections between tables, such as linking "OrderID" in a "Customers" table to an "Orders" table. In social networks, relational semantics describe connections (e.g., "User A follows User B" vs. "User A is a friend of User B"), capturing differences between hierarchical and bidirectional relationships. In ontology-based systems, hierarchical taxonomies provide relational semantics (e.g., "Dog is a subclass of Mammal," "A Mammal is an Animal"), structuring information based on class relationships. Relational semantic information enhances search and retrieval operations by allowing inference-based reasoning, such as suggesting that "CEO of Company X" and "Board Member at Company X" indicate high-level business roles, even if the individual titles differ.

In addition to descriptive and relational semantic information, additional types may be used, depending on the domain and data structure. One category is contextual semantic information, which depends on external factors such as time, location, user intent, or environment. For example, in natural language processing, the phrase "Apple stock surged today" derives contextual meaning from the financial domain, whereas "Apple is rich in fiber" is contextually relevant to nutrition. In process modeling, a decision node labeled "Approve Loan?" carries contextual semantic meaning based on loan policies, customer credit score, and regulatory rules at the time of approval. In sensor data processing, semantic meaning can depend on real-world conditions, such as interpreting a temperature reading of 100° F. differently if recorded in a weather station vs. an industrial furnace.

Other categories of semantic information include inferential semantics, where meaning is deduced based on logical reasoning (e.g., "If X is a subset of Y, and Y is part of Z, then X is also part of Z"), and functional semantics, where meaning is based on an element's intended role within a system (e.g., a "Submit" button vs. a "Cancel" button in a user interface). Domain-specific semantic information is also crucial in technical fields such as medicine, where terms like "Myocardial Infarction" and "Heart Attack" carry identical meanings but may be used differently depending on the audience (medical professionals vs. patients).

To construct these embeddings, process representations are first converted into numerical form. As illustrated in FIG. 3, process elements 308 are verbalized at 312 to generate a structured text representation 316 suitable for embedding. This transformation converts structured process relationships into natural language descriptions, allowing neural language models such as SBERT to generate more semantically meaningful vector representations.

Since structured data formats such as RDF do not directly align with the input expected by sentence embedding models, verbalization helps preserve relationships in a manner that enhances embedding quality. In other cases, embeddings can be generated directly from raw graph data, such as RDF triples, without verbalization.

As an example, a process step "Generate Invoice" may be represented in an RDF-based process graph as:

```
@prefix ex: <http://www.example.org/process#>.
@prefix bbo: <http://www.example.org/bbo#>.
ex:GenerateInvoice a bbo:Activity;
  bbo:hasDescription "Creates an invoice based on order data";
  bbo:hasPredecessor ex:ValidateOrder;
  bbo:hasSuccessor ex:SendInvoice;
  bbo:performedBy ex:BillingSystem.
```

To extract relevant process relationships, the system applies SPARQL queries to retrieve RDF triples, such as:

```
PREFIX bbo: <http://www.example.org/bbo #>
PREFIX ex: <http://www.example.org/process #>
SELECT ?activity ?desc ?pre ?post ?system
WHERE {
  ?activity a bbo:Activity.
  OPTIONAL {?activity bbo:hasDescription ?desc.}
  OPTIONAL {?activity bbo:hasPredecessor ?pre.}
  OPTIONAL {?activity bbo:hasSuccessor ?post.}
  OPTIONAL {?activity bbo:performedBy ?system.}
}
```

The retrieved RDF triples are transformed into natural language descriptions using predefined templates, providing compatibility with text-based embedding models. This transformation allows structured data to be processed using neural language models, enhancing semantic representation. The following is an example of a verbalized text representation:

Verbalized Text Representation:

"The activity Generate Invoice creates an invoice based on order data. It occurs after Validate Order and before Send Invoice. This activity is performed by the Billing System."

Once textual representations are created, vector encoding at 320 generates a corresponding vector representation 324, such as by:

```
from sentence_transformers import SentenceTransformer
#Load pre-trained SBERT model
model=SentenceTransformer('all-mpnet-base-v2')
#Verbalized process description
text_description="Customer Order Management: Receive Order, Validate Order, Generate Invoice, Ship Product"
#Generate text-based embedding
text_embedding=model.encode(text_description)
print(text_embedding.shape) #Outputs: (768,) for a 768-dimensional vector
```

SBERT (Sentence-BERT) encodes natural language descriptions of process elements into high-dimensional vector representations. Unlike traditional word embeddings, SBERT captures contextual meaning at the sentence level, making it effective for aligning semantically similar but structurally different process steps. This allows for more precise similarity comparisons, even when different terminologies are used to describe equivalent process steps.

In forming the second embedding vector, a parent node 330 is selected that corresponds to the current process element, representing the hierarchical context within the structured graph. The selection of this parent node varies depending on the level of process abstraction being evaluated. At the highest abstraction (process level), the parent node represents an overarching process category. At the activity level, the parent node represents the containing process. At the schema level, the parent node reflects a broader schema category or ontology classification. Finally, at the instance level, the parent node corresponds to a high-level business objective.

After selecting the parent node, a second embedding 338 is generated at 334 to capture hierarchical structure by separately encoding this parent node. While text-based embeddings effectively capture semantic relationships from verbalized descriptions, they do not inherently encode structural dependencies such as execution order and hierarchical relationships. To address this limitation, a graph-based embedding of the parent node is generated using RDF2Vec, which applies random walk-based feature learning over structured graph representations. This method encodes both relational and hierarchical context that may not be evident from text alone.

By incorporating hierarchical structure through this parent node embedding, the system captures relationships such as precedence constraints, dependencies, and associations with other system components. For example, at the activity level, the embedding generated for a "Generate Invoice" activity considers its parent process node, "Customer Order Management," so that both the semantic meaning of the invoice generation step and its structural relationship to other activities within the same process are included in the embedding.

The hierarchical embedding enhances alignment accuracy by supplementing semantic embeddings with explicit contextual encoding from the structured graph representation. This approach improves alignment decisions by considering both terminological similarity and the positional and functional role of each process element within a workflow. Consequently, hybrid embeddings can provide for accurate process matching even when textual descriptions alone lack clarity or completeness regarding structural dependencies.

At 350, embeddings 324 and 338 are merged to create a hybrid vector representation 354. This approach enables a more comprehensive similarity evaluation by integrating complementary information: semantic meaning from textual embeddings and structural dependencies from graph-based embeddings. The merge process can be represented as:

$$V_3=[V_1 \oplus V_2]$$

where $\oplus$ denotes vector concatenation along the feature axis. This transformation preserves both types of information, ensuring that similarity calculations consider both semantic and structural relationships between process elements.

The resulting hybrid vector 354, $V_3$, has twice the dimensionality of the original embeddings. For example, if each individual embedding is a 768-dimensional vector (typical for SBERT), the merged vector will have 1,536 dimensions:

```
import numpy as np
#Example embeddings (SBERT and RDF2Vec)
text_embedding=np.random.rand(768) #Simulated SBERT embedding
graph_embedding=np.random.rand(768) #Simulated RDF2Vec embedding
#Hybrid vector via concatenation
hybrid_embedding=np.concatenate((text_embedding, graph_embedding))
print(hybrid_embedding.shape) #Outputs: (1536,)
```

By incorporating both linguistic and structural data, the hybrid embedding allows for more accurate similarity calculations compared to traditional approaches that rely on a single embedding type. For example, a process labeled "Customer Order Management" may have a textually similar but structurally different counterpart labeled "Enterprise Sales Order Processing." A traditional text-based matcher might assign a high similarity score based on terminology alone, while a structure-based matcher might fail to recognize equivalent processes due to format differences. The hybrid vector approach compensates for both shortcomings, allowing a balanced alignment based on textual and structural factors.

Since the hybrid vector ($V_3$) has twice the dimensionality of the original embeddings, directly computing similarity scores for large-scale process graphs may be computationally expensive. To mitigate this, Principal Component Analysis (PCA) can be applied at 360 to produce a reduced vector 364, which preserves key features while improving computational efficiency. PCA identifies the principal components that account for the highest variance across hybrid vectors. By projecting $V_3$ onto a lower-dimensional subspace, redundant information is eliminated, while key semantic and structural relationships are retained:

$$V=PCA_k(V_3)$$

where $PCA_k$ denotes the projection onto the top k principal components that captures the greatest variance.

The PCA transformation can be implemented using Scikit-learn as follows:

```
from sklearn.decomposition import PCA
import numpy as np
#Simulated high-dimensional hybrid vectors (e.g., 1536 dimensions)
hybrid_vectors=np.random.rand(1000, 1536) #1000 process elements
#Apply PCA to reduce to 300 dimensions
pca=PCA(n_components=300)
reduced_vectors=pca.fit_transform(hybrid_vectors)
print(reduced_vectors.shape) #Outputs: (1000, 300)
```

This reduction preserves alignment quality while significantly reducing computational overhead. By lowering dimensionality in this example from 1536 to 300, similarity computations become more efficient without materially affecting accuracy.

Once dimensionality reduction is complete, the system proceeds to 370, where similarity computations between optimized embeddings of the source and reference process graphs are performed to establish alignments between process elements.

To measure similarity, one implementation applies cosine similarity, which evaluates the angular distance between two vectors in the embedding space. This approach works well against differences in vector magnitude, such that alignment is based primarily on semantic and structural features rather than absolute numerical values. The cosine similarity formula is:

$$\text{Similarity }(V_s, V_r) = \frac{V_s \cdot V_r}{\|V_s\| \times \|V_r\|}$$

where $V_s$ is the reduced hybrid vector for a process element in the source graph, $V_r$ is the reduced hybrid vector in the reference graph, and $\|V\|$ represents the vector magnitude (L2 norm).

Pairwise similarity scores are calculated between elements in the source graph and all elements in the reference graph. The process is implemented as follows:

```
from sklearn.metrics.pairwise import cosine_similarity
import numpy as np
#Simulated reduced hybrid vectors (e.g., 300-dimensional vectors after PCA)
source_vectors=np.random.rand(500, 300) #500 elements in source graph
reference_vectors=np.random.rand(500, 300) #500 elements in reference graph
#Compute cosine similarity between all source-reference pairs
similarity_matrix=cosine_similarity(source_vectors, reference_vectors)
#Identify the best match for each source element
best_matches=np.argmax(similarity_matrix, axis=1)
#Print alignment results
```

```
for i, match in enumerate(best_matches):
    print(f"Source element {i} aligns with Reference element {match}(Score: {similarity_matrix[i][match]:.4f})")
```

Each source element is matched with the reference element having the highest similarity score. Thresholding can further exclude low-confidence alignments. Final alignment results are stored for downstream analysis, such as business optimization or compliance validation.

Figure 4:
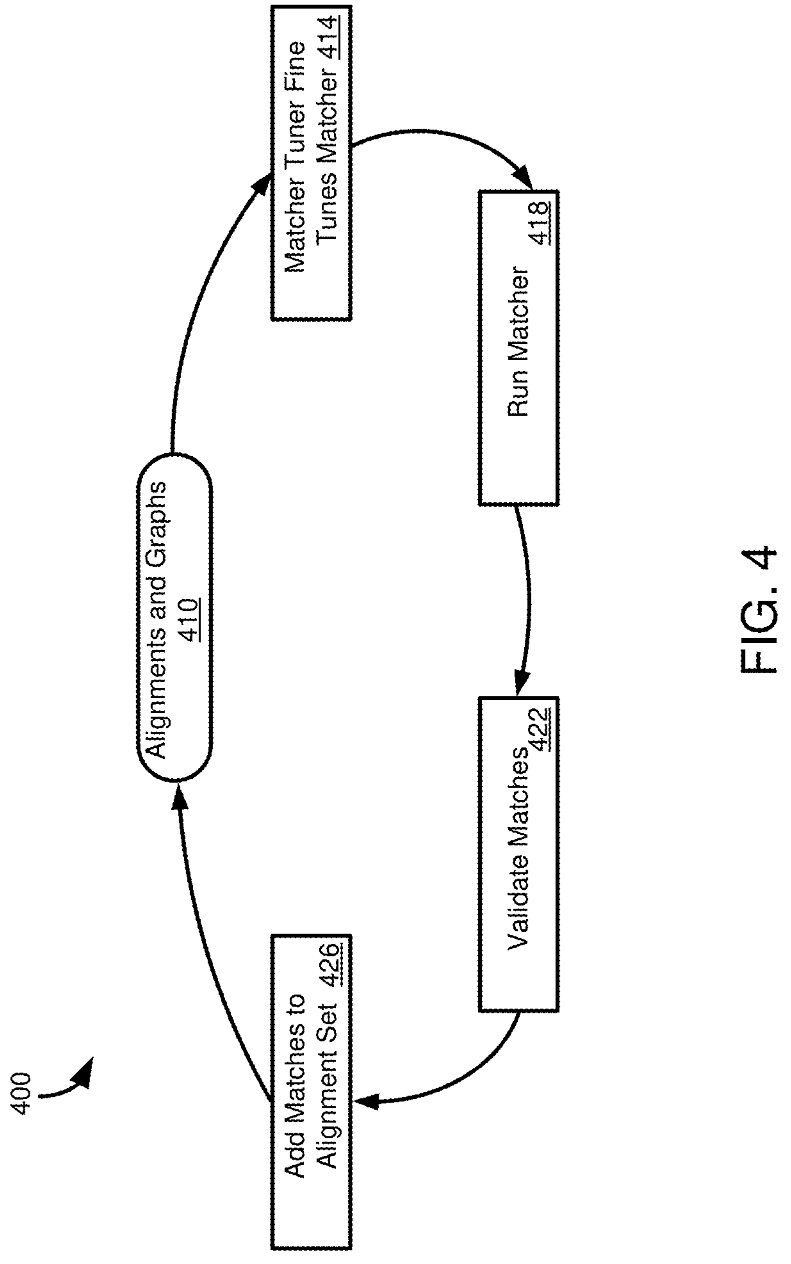
FIG. 4 is a diagram illustrating an iterative process for tuning a matcher used for graph alignments.

FIG. 4 depicts a matcher tuning process 400, which operates by iteratively refining matcher parameters based on feedback from validated alignments. An alignment set 410 is maintained, which stores confirmed correspondences between process elements. These validated alignments serve as a foundation for improving matcher performance. In particular, when applied to embedding-based matching techniques, the tuning process adjusts similarity evaluation thresholds for hybrid embeddings, helping maintain accuracy over time. The matcher tuner 156 of FIG. 1 uses this alignment set 410 along with the underlying process graphs to fine-tune matcher parameters at 414. This refinement process includes adjusting similarity thresholds, modifying weighting factors, and optimizing embedding configurations to reduce false positives and false negatives.

Once tuning adjustments are applied, the refined matcher is re-executed at 418, generating an updated set of matches using the improved parameter settings. During this phase, similarity computations—such as cosine similarity or approximate nearest-neighbor search—are analyzed to determine whether reprocessed alignments improve accuracy. These new matches then enter a validation phase 422, where they are reviewed for correctness. The validation process may involve automated verification techniques (e.g., confidence scoring, rule-based validation) or human review to confirm high-quality results. Confidence thresholds derived from previous successful alignments may be used to determine whether a match should be retained or flagged for further refinement. If a match is deemed valid, it is added to the alignment set at 426, expanding the repository of confirmed correspondences.

The matcher tuning process 400 functions as an iterative loop, allowing matcher accuracy to be improved progressively. With each cycle, matcher behavior is fine-tuned based on real-world alignment data, increasing the system's ability to identify semantically equivalent process elements across different organizations and business models. Additionally, the tuning process helps mitigate concept drift by dynamically adjusting embeddings to reflect changes in process terminology, metadata structures, or operational workflows. This dynamic adaptation allows matching techniques to remain effective even as process terminology, structures, and best practices evolve over time.

By incorporating matcher tuning, disclosed techniques can significantly reduce the manual effort required for process alignment while increasing confidence in match accuracy. For hybrid embeddings, tuning helps retain an optimal balance between semantic and structural features, even as underlying data distributions shift. This process also refines an embedding-based matcher by continuously improving the quality of input data used to train similarity models.

Example 4)—Example Metrics

After matcher tuning has refined alignment accuracy, disclosed techniques can apply structured evaluation metrics to assess process similarity and transformation effort. Unlike similarity scores computed during matching, which focus on element-level alignment, metric computation evaluates process alignment at a broader level. Metrics quantify how closely a process aligns with a reference process model, or a larger set of process models or process model components, how much modification is required, and how effectively standardization has been achieved.

Figure 5:
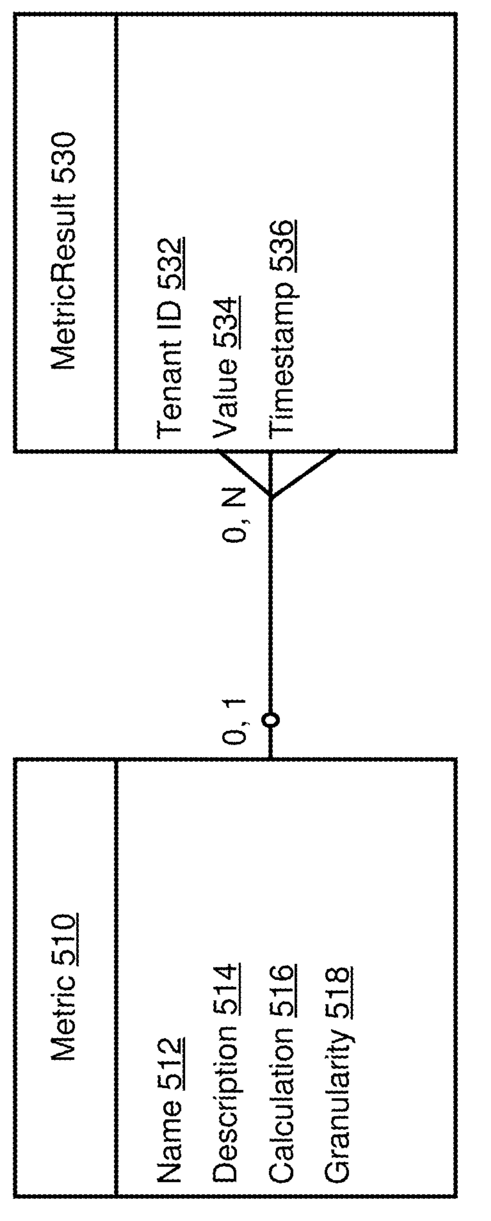
FIG. 5 depicts a metric data model, illustrating the relationships between metric definitions and stored metric results.

FIG. 5 illustrates the metric data model 500, which defines how metrics and metric results are structured and stored. Each metric is defined by an instance of a metric entity 510 (which may be implemented as a data object, such as a database table, view, or class instance, where attributes in metric entity 510 correspond to object properties). The metric entity includes a name 512, describing the evaluation being performed, and a description 514, explaining its purpose. A calculation attribute 516 specifies the formula or computational method used to derive the metric value, while the granularity attribute 518 determines whether the metric applies at a process level, across multiple alignments, or as a global measure of process standardization.

Values computed for an instance of a particular metric are stored in a metric result entry 530, which records individual evaluations over time. Each result is associated with a tenant identifier 532, allowing organizations to track their own alignment evaluations independently. A value attribute 534 contains the computed metric score, while the timestamp 536 records when the evaluation occurred. The metric result entity 530 supports historical evaluations, enabling tracking of alignment trends over time.

Disclosed techniques support multiple types of process evaluation metrics. One such metric is the process similarity percentage, which quantifies the extent to which a process matches a reference workflow. This metric operates at the process level, evaluating the similarity between embedding representations of a source process and a reference model. An example implementation of this computation is:

```
from sklearn.metrics.pairwise import cosine_similarity
def compute_process_similarity(source_embedding, reference_embedding):
    similarity=cosine_similarity([source_embedding], [reference_embedding])[0][0]
    return round(similarity*100, 2)
source_vector=model.encode("Customer Order Management Process")
reference_vector=model.encode("Standard Order Fulfillment Process")
similarity_score=compute_process_similarity(source_vector, reference_vector)
print(f"Process Similarity: {similarity_score}%")
```

Another metric, the global similarity percentage, aggregates process similarity scores to compute an overall alignment score for an organization. This score represents the average alignment accuracy across all matched processes. Example code for this evaluation is:

```
def compute_global_similarity(process_scores):
    return round(sum(process_scores)/len(process_scores), 2) if process_scores else 0
process_similarities=[85.3, 90.1, 76.8, 88.5]
global_similarity=compute_global_similarity(process_similarities)
print(f"Global Similarity: {global_similarity}%")
```

A third metric, the share of matched processes, measures the percentage of processes in the source graph that have been successfully aligned with a reference process. This metric is computed as the ratio of matched processes to total processes in the source graph. The following implementation demonstrates this calculation:

```
def compute_matched_process_share(matched_count, total_count):
    return round((matched_count/total_count)*100, 2) if total_count>0 else 0
matched_processes=45
total_processes=50
matched_share=compute_matched_process_share
  (matched_processes,
total_processes)
print(f"Share of Matched Processes: {matched_share}%")
```

Once alignment data is available, metrics are computed using a metric execution engine, which retrieves the relevant evaluation criteria, determines the appropriate granularity, executes the computation logic, and stores the computed results. The following implementation example demonstrates a metric execution function:

```
from datetime import datetime
def execute_metric(metric_function, *args):
    result_value=metric_function(*args)
    return {"value": result_value, "timestamp": datetime.now( )}
metric_result=execute_metric(compute_process_similarity, source_vector, reference_vector)
print(f"Metric Value: {metric_result['value']} at {metric_result['timestamp']}")
```

Once computed, metric results are stored in the metric result entity 530, allowing for alignment evaluations to be maintained over time. These stored evaluations can support retrospective analysis, transformation planning, and compliance tracking.

To optimize metric computation across large process datasets, performance-enhancing techniques can be used, including parallelized metric execution to process large datasets concurrently. Caching mechanisms prevent redundant calculations when a process has not changed since its last evaluation. Graph pruning techniques prioritize computational resources on the most significant process elements rather than evaluating every node in the graph.

Example 5)—Example User Interfaces Facilitating Graph Matching and Evaluation Disclosed techniques provide a user interface for configuring, executing, and analyzing process alignments. The interface allows users to select matchers and metrics, validate alignment results, and track improvements in process similarity over time. By structuring alignment interactions through a graphical interface, users can manage process standardization without requiring direct access to backend data processing. The interface can include multiple interactive screens, each supporting a specific aspect of the alignment workflow. The following figures provide an example user interface, but other types of user interfaces can be used that provide functionality equivalent to those shown.

Figure 6:
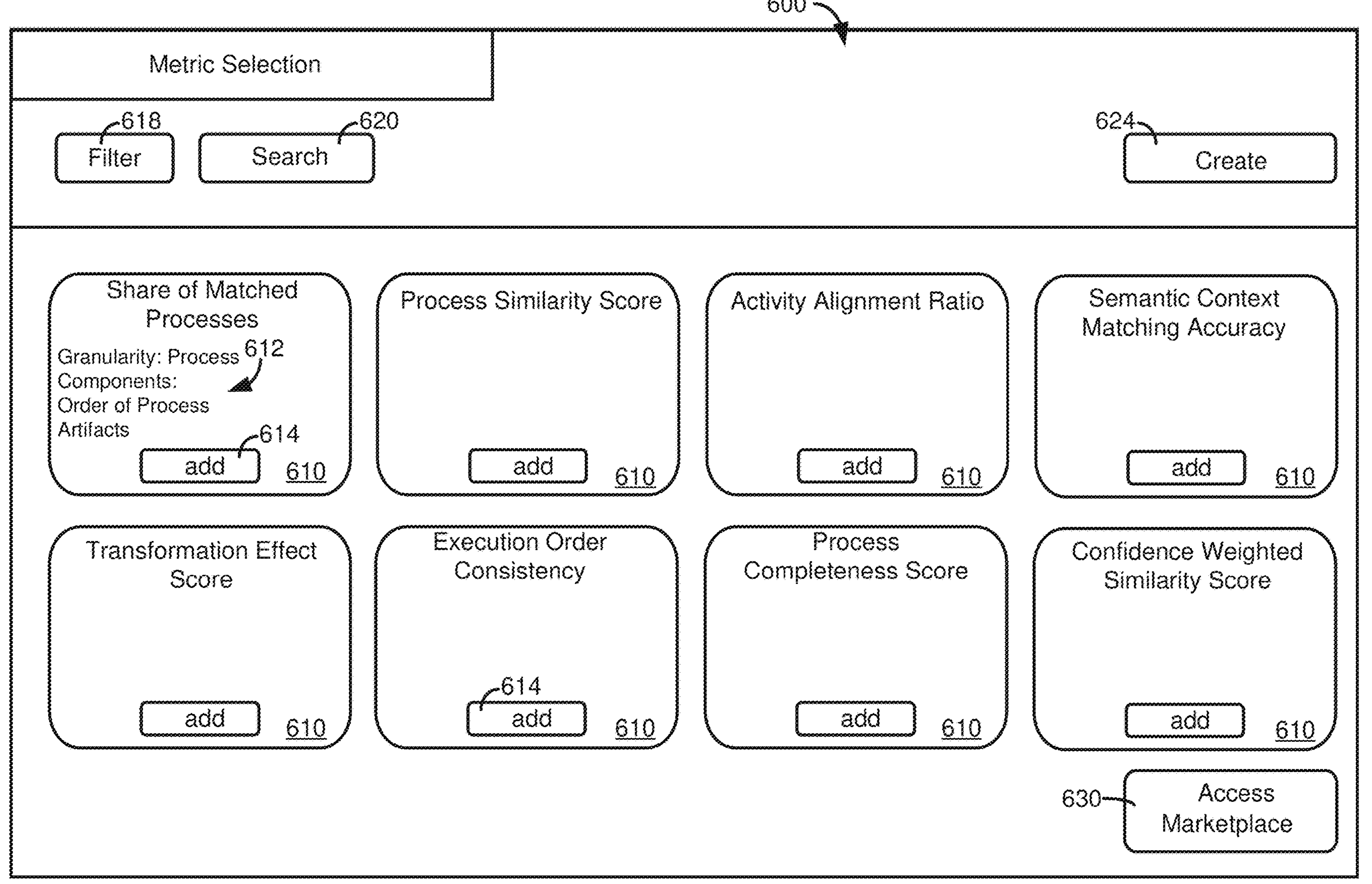
FIG. 6 is an example user interface for selecting metrics for evaluating graph alignments.

FIG. 6 illustrates a metric selection screen 600, where users can select from predefined metrics to be included in a metric repository or for a particular analysis of a set of processes. The screen displays available metrics 610, allowing users to browse and select metrics relevant to their evaluation needs. Each metric is associated with computing code or other computer-readable instructions that implement the metric, such as code that conforms to a metric interface.

Each metric includes a description 612, which provides information about its functionality and intended use. The description specifies the granularity level at which the metric operates, whether at the process level, the component level, or based on the order in which process artifacts are analyzed. It also indicates the process components evaluated by the metric, such as activities, transitions, decisions, metadata, or dependencies. Some metrics 610 may account for the sequence of process artifacts, allowing similarity computations to incorporate execution order and identify deviations in workflow structure.

The order of process artifacts is particularly relevant for metrics evaluating workflow execution consistency, where deviations in sequence impact similarity scoring. Users can select and configure metrics by interacting with an add user interface control 614, which allows metrics 610 to be included in a repository or applied to an alignment analysis.

A filtering option 618 can be selected to refine the display of available metrics, such as by process type, industry, or historical usage. User interface element 620 allows a user to search for particular metrics, such as using a keyword associated with a desired metric.

If a metric is desired but not available, a user can select to create a new metric through user interface element 624. For example, selecting the user interface element 624 can take the user to an IDE or wizard type functionality to create code for a new metric, which can include manual or assisted generation of code that implements a metric interface. In some cases, a user can select to connect to another source of metrics 610, such as a metric marketplace, using user interface element 630. For example, a software provider may make additional metrics 610 available, or users of a software program can share defined metrics.

Figure 7:
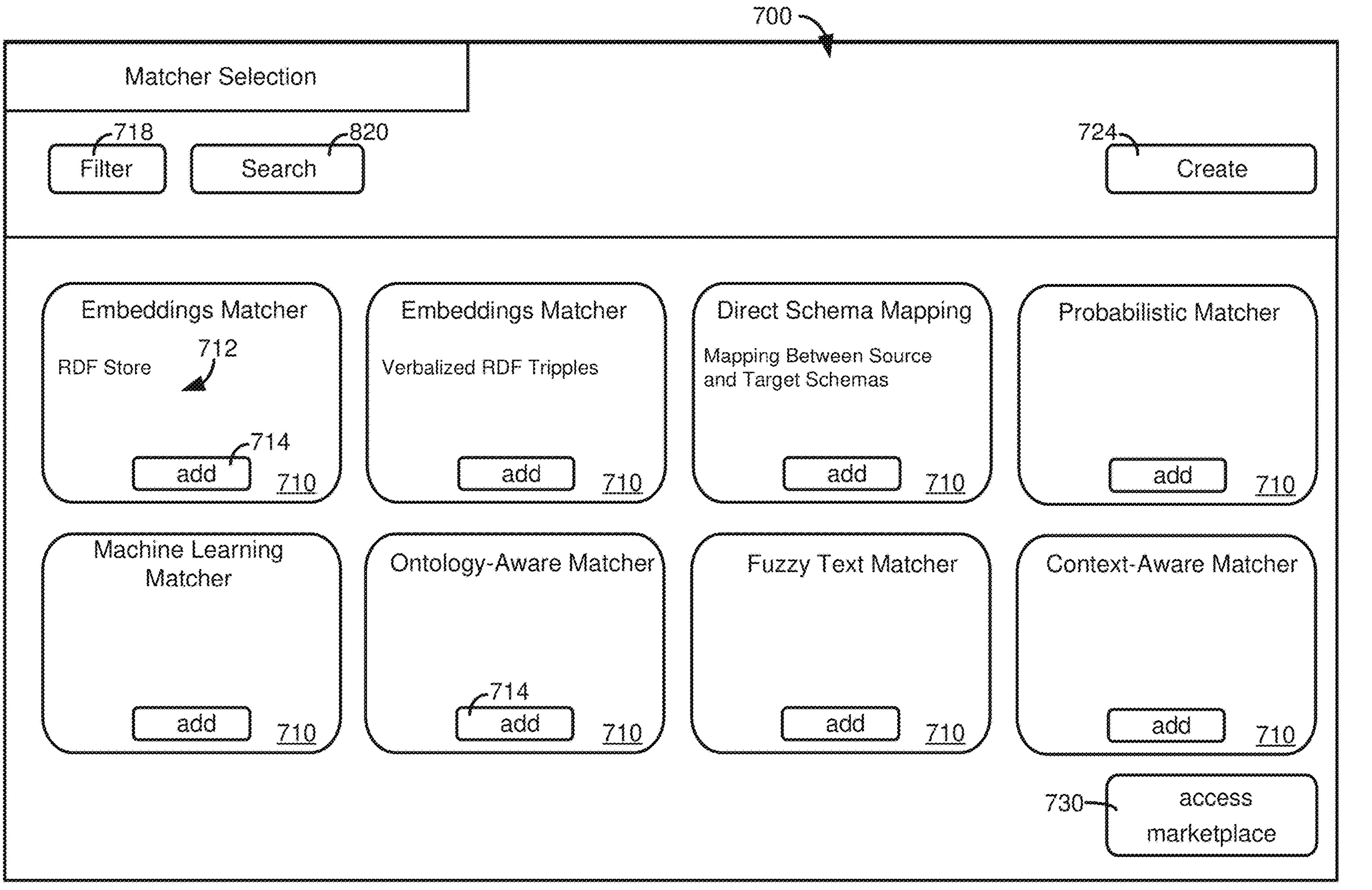
FIG. 7 is an example user interface for selecting a matching technique for performing graph alignments.

FIG. 7 provides a screen 700 that can be used to select a matcher, for a repository or for use in generating a particular alignment, and is generally similar to the user interface screen 600. The screen 700 displays available matchers 710. Matchers 710 can be associated with a description 712, such as a particular name of the matcher, and can include a description of aspects of a given matcher. For example, the description 712 can define what technique is used by the matcher, such as whether the matcher uses raw RDF information, verbalized RDF triples, or a predefined static mapping. Optionally, the description 712 of a matcher 710 can include information such as indicators of relative time taken to complete a matching process using a matcher, computing resources used, or measures of historical accuracy of alignments produced using a particular matcher.

A user can select to add a particular matcher 710 to a repository or to a particular analysis using corresponding user interface elements 714. As with the user interface screen 700, a user can select to filter matchers, such as to particular types (such as based on an algorithm type of matchers 710) using a filter user interface element 718, or to search for particular matchers by selecting a user interface element 720. If a matcher 710 with the desired properties is not found, a user can select to create a new matcher by selecting user interface element 724. Selecting user interface element 724 can present a screen where a user can configure or code a new matcher 710, including by completing an implementation of an interface for matchers 710. Defining a new matcher 710 can include presenting the user with an IDE-type interface or wizard functionality.

Alternatively, a user can select user interface element 730 to be taken to another repository, such as a marketplace, that may contain additional matchers 710, in a similar manner as described for metrics 610.

Figure 8:
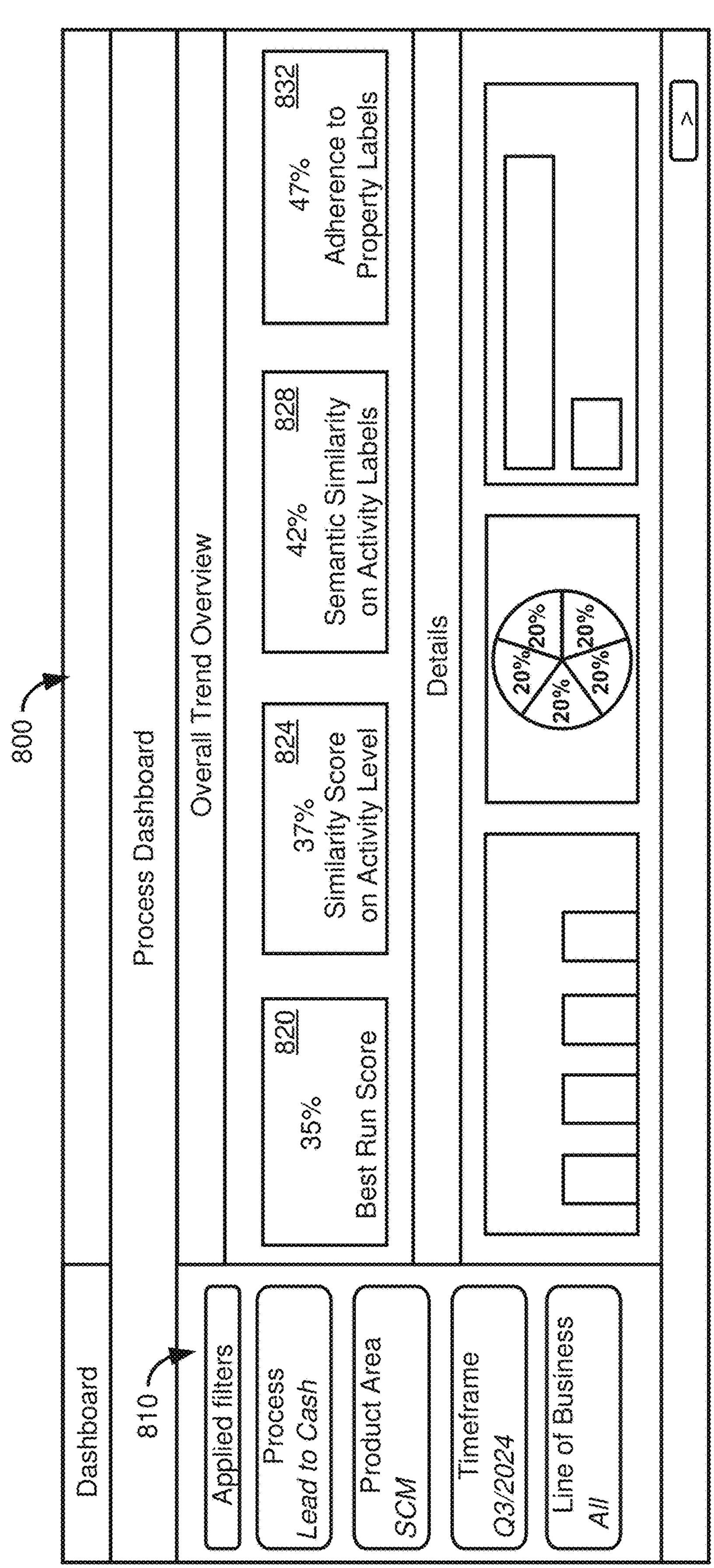
FIG. 8 is an example user interface displaying metric results from a graph alignment evaluation.

FIG. 8 displays an example dashboard 800 providing metric results. Filter section 810 indicates particular filters associated with the metric results, including a particular process being analyzed, a product area, a particular timeframe, and a line of business. The best run score 820 provides a benchmarking metric that reflects the highest similarity score achieved for a particular process alignment across multiple executions, allowing users to compare current alignment results to historically optimal alignments.

The similarity score based on activity level 824 quantifies the structural similarity between a source process and a reference process by evaluating the degree to which activities and their dependencies align, helping users determine whether the sequence and execution flow of activities match expected standards. The semantic similarity of activity labels score 828 measures how closely the textual labels of activities in a source process correspond to those in the reference process, using techniques such as embedding-based comparisons or fuzzy text matching to assess whether process steps with different terminology may still represent equivalent functions. The adherence to property labels score 832 evaluates how well attribute-level metadata, such as process categorization, assigned roles, or expected input/output properties, match the reference process, providing insight into whether a process is correctly classified and adheres to expected process definitions at a more granular metadata level.

Figure 9:
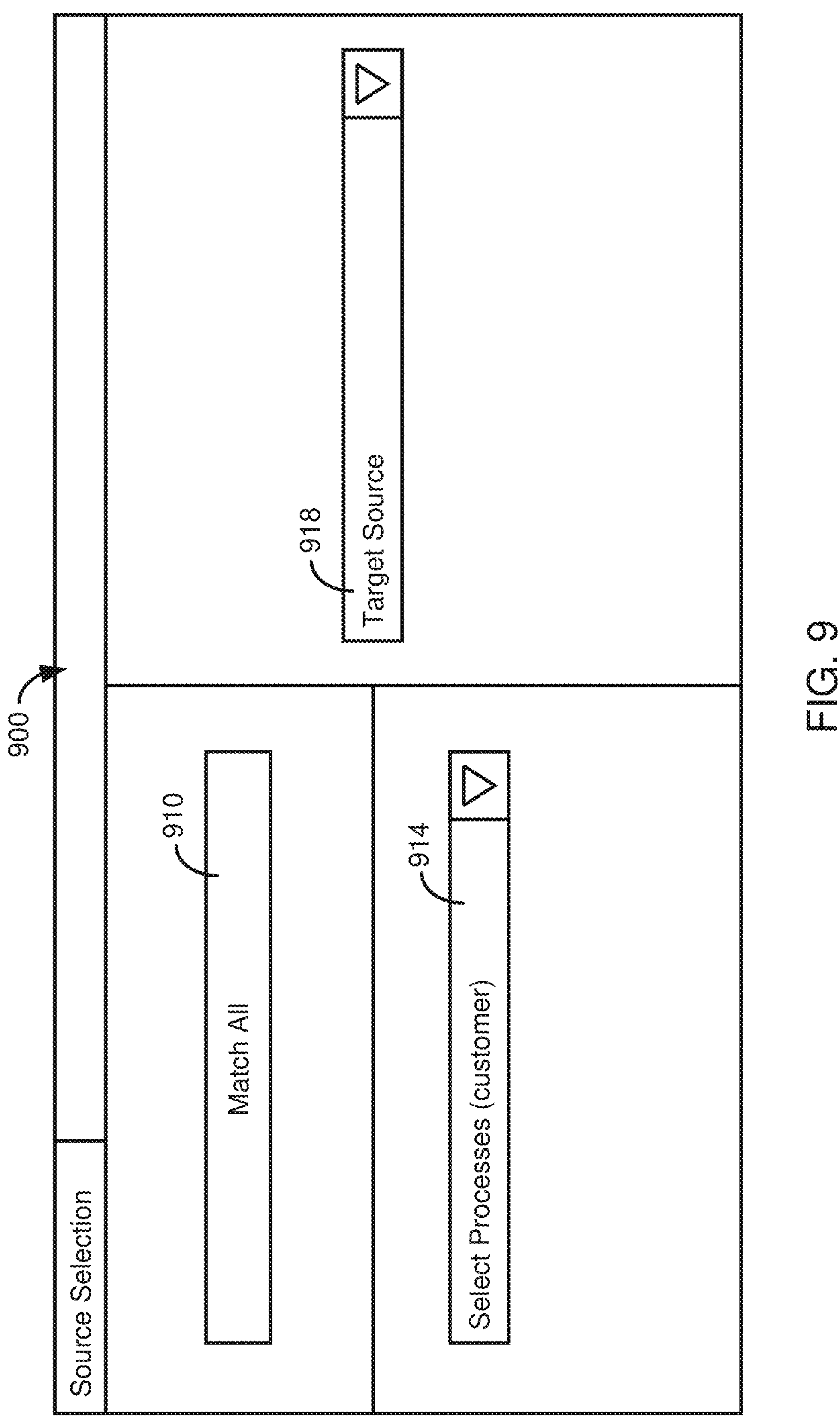
FIG. 9 is an example user interface allowing a user to defining a matching task.

FIG. 9 provides an example user interface 900 that allows a user to define a matching task, which determines an alignment between a selected source and a selected target. In some cases, a user may wish to perform an alignment for a graph that includes multiple processes. In FIG. 9, this can be accomplished by selecting user interface element 910.

In other cases, users may be interested in alignments between a specific process and a reference process. In this case, a user can use user interface element 914 to select a particular process represented in the graph. The target graph, or process, can be selected using user interface element 918.

Figure 10:
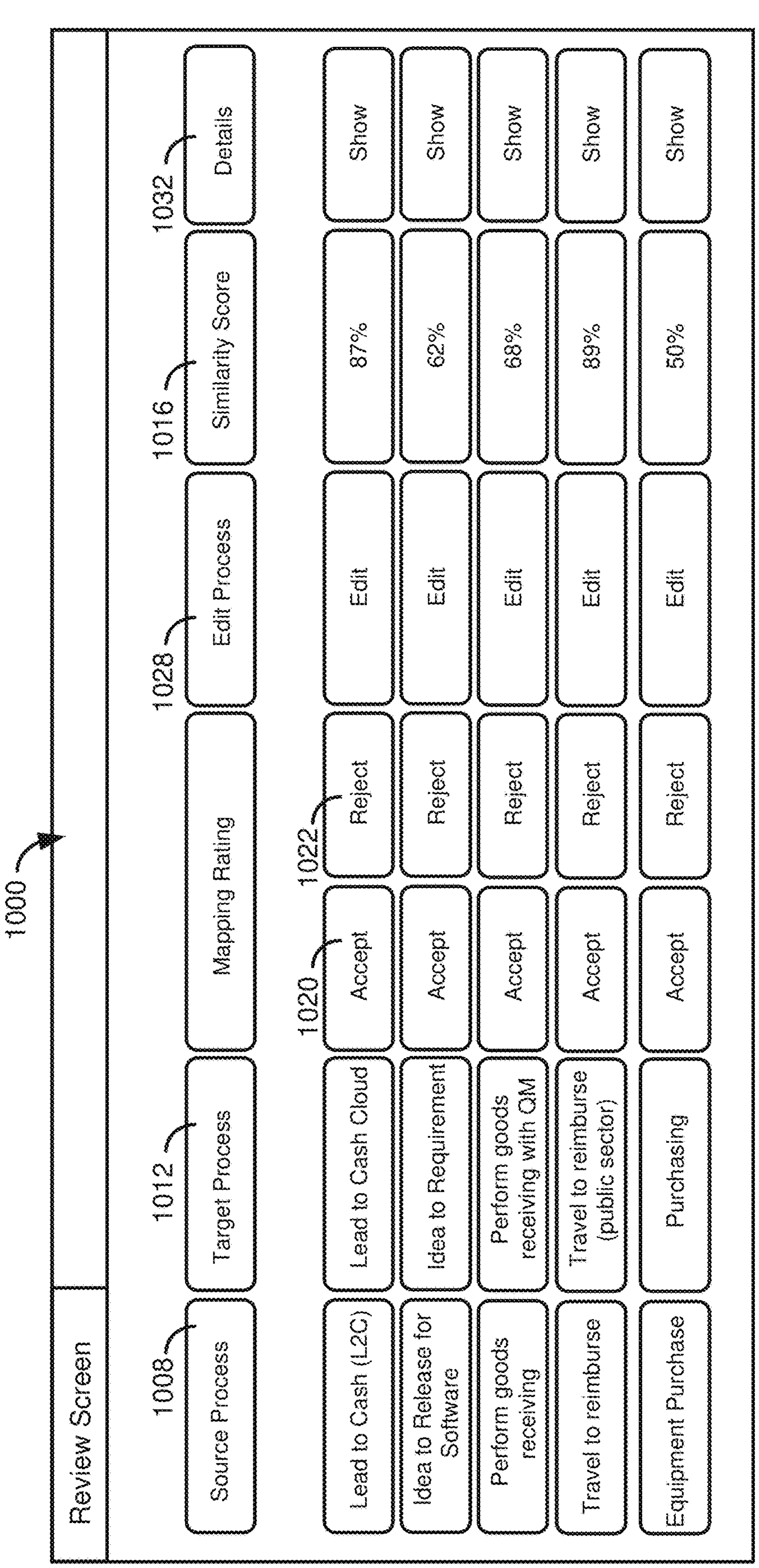
FIG. 10 is an example user interface presenting match results and allowing for user feedback regarding result accuracy.

FIG. 10 presents a match result review screen 1000, where users validate correspondences generated by a matcher. The screen 1000 displays a list of proposed matches, where each proposed match includes a source process 1008 and a target process 1012. Each match is accompanied by a similarity score 1016, indicating the confidence level of the alignment, and a mapping rating user interface elements 1020, 1022, which allow users to, respectively, accept or reject proposed matches. The accept element 1020 confirms that the match is valid and incorporates it into the alignment set, while the reject element 1022 removes it from further consideration.

If adjustments are desired, an edit user interface element 1028 can be selected to take the user to a manual refinement interface, allowing users to modify the alignment or the target process. Each match can be associated with a details user interface element 1032, which provides access to additional match metadata, process dependencies, and confidence scores.

Figure 11:
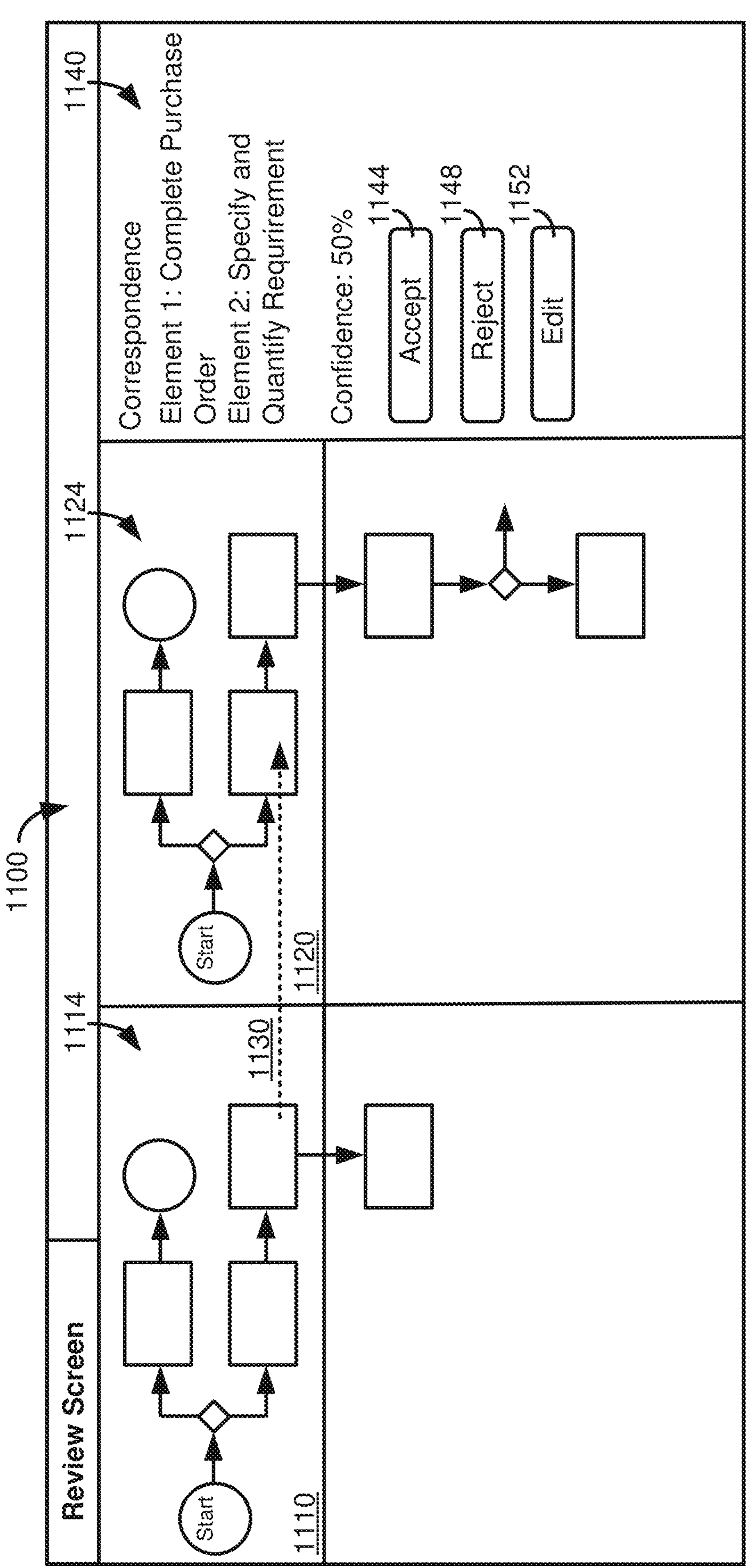
FIG. 11 is an example user interface illustrating component alignment between two process representations.

FIG. 11 shows a process-level analysis screen 1100, where users examine alignment results at a granular level. The screen 1100 can be displayed in response to a user selecting user interface element 1028 of FIG. 10.

A panel 1110 shows a source process 1114, and a panel 1120 shows a target process 1124. A dashed line 1130 indicates a proposed alignment between an element of the source process 1114 and a proposed match in the target process 1124.

Panel 1140 provides information about the proposed match, including identifying the proposed matching elements and indicating a matching confidence. A user can select to accept the match through user interface element 1144, or to reject the match through user interface element 1148. A user can select to edit the match using user interface element 1152. Editing can include changing a mapped element of the source process 1114 or the target process 1124 to a different element of the corresponding process. Editing can also be used to take a user to a screen where matcher or match settings can be adjusted to improve match quality. Selecting accept 1144 or reject 1148 can cause metrics or matcher configurations to be automatically updated, such as providing labelled training data.

Example 6)—Examples Operations

Figure 12A:
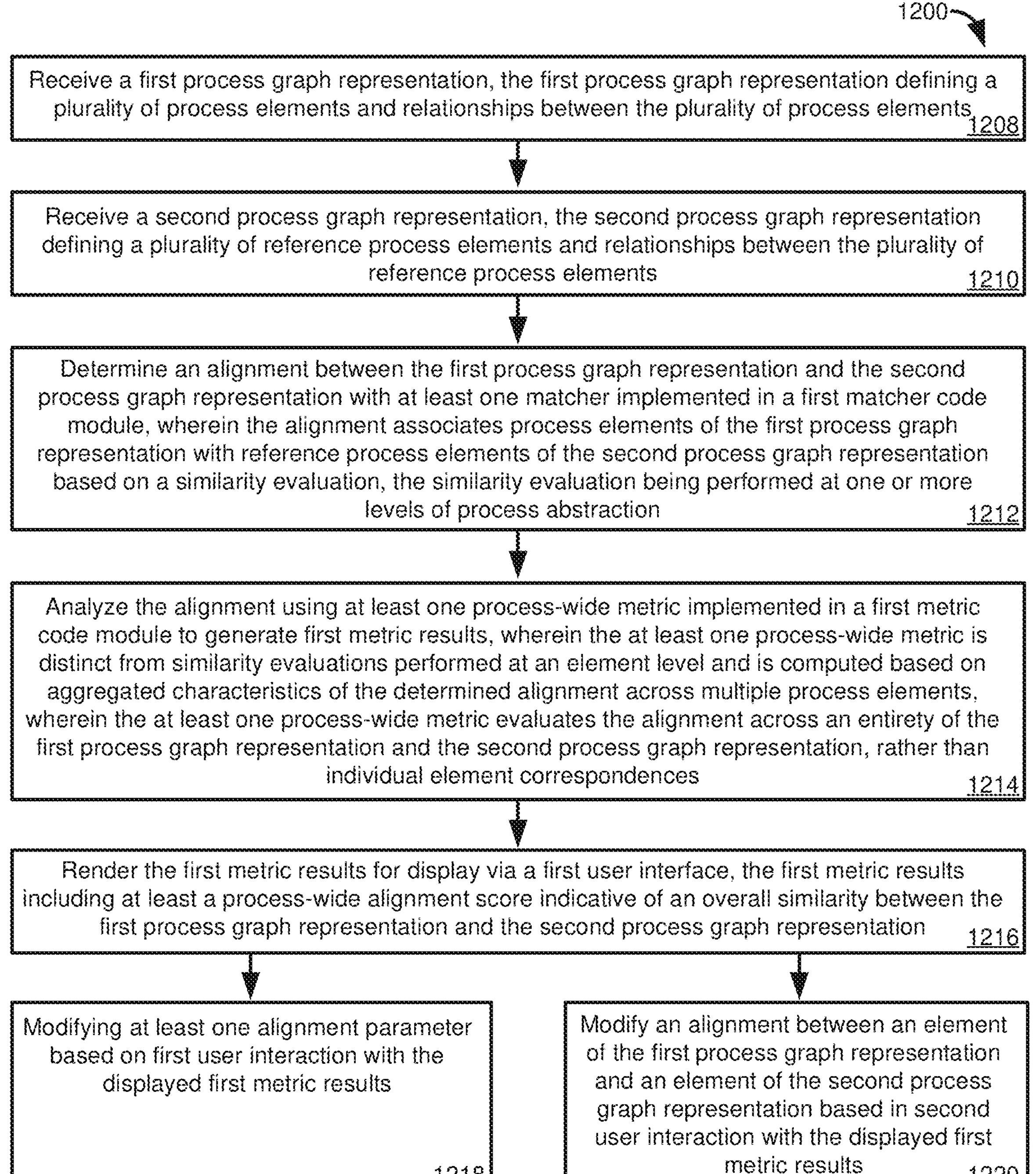
FIG. 12A is a flowchart of a process for aligning and analyzing process graph representations.

FIG. 12A is a flowchart of a process 1200 for aligning and analyzing process graph representations. At 1208, a first process graph representation is received, where the first process graph representation defines a plurality of process elements and relationships between the plurality of process elements. A second process graph representation is received at 1210, where the second process graph representation defines a plurality of reference process elements and relationships between the plurality of reference process elements.

At 1212, an alignment between the first process graph representation and the second process graph representation is determined using at least one matcher implemented in a first matcher code module. The alignment associates process elements of the first process graph representation with reference process elements of the second process graph representation based on a similarity evaluation, where the similarity evaluation is performed at one or more levels of process abstraction.

The alignment is analyzed at 1214 using at least one process-wide metric implemented in a first metric code module to generate first metric results. The at least one process-wide metric is distinct from similarity evaluations performed at an element level and is computed based on aggregated characteristics of the determined alignment across multiple process elements. The at least one process-wide metric evaluates the alignment across an entirety of the first process graph representation and the second process graph representation, rather than individual element correspondences.

At 1216, the first metric results are rendered for display via a first user interface. The first metric results include at least a process-wide alignment score indicative of an overall similarity between the first process graph representation and the second process graph representation.

At 1218, at least one alignment parameter is modified based on first user interaction with the displayed first metric results. Alternatively, at 1220, an alignment between an element of the first process graph representation and an element of the second process graph representation is modified based on second user interaction with the displayed first metric results.

Figure 12B:
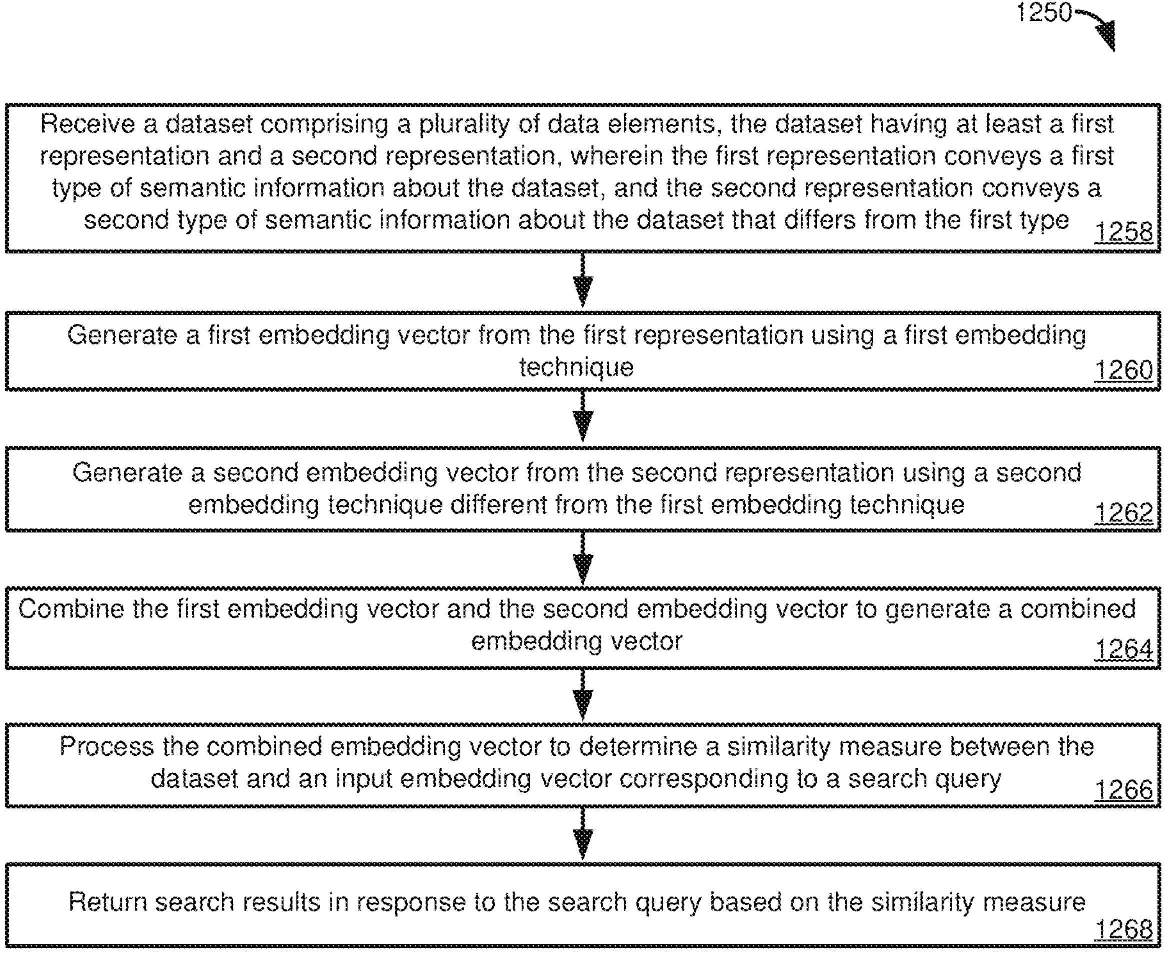
FIG. 12B is a flowchart of a process for generating and processing embedding vectors from multiple dataset representations.

FIG. 12B is a flowchart of a process 1250 for generating and processing embedding vectors from multiple dataset representations. At 1258, a dataset is received, where the dataset includes a plurality of data elements and has at least a first representation and a second representation. The first representation conveys a first type of semantic information about the dataset, and the second representation conveys a second type of semantic information about the dataset that differs from the first type.

A first embedding vector is generated at 1260 from the first representation using a first embedding technique. At 1262, a second embedding vector is generated from the second representation using a second embedding technique that is different from the first embedding technique.

At 1264, the first embedding vector and the second embedding vector are combined to generate a combined embedding vector. The combined embedding vector is processed at 1266 to determine a similarity measure between the dataset and an input embedding vector corresponding to a search query.

At 1268, search results are returned in response to the search query based on the similarity measure.

Example 7)—Additional Examples

Example 1 is a computing system that includes at least one memory, one or more hardware processors coupled to the at least one memory, and one or more computer-readable storage media storing computer-executable instructions. When executed, the instructions cause the computing system to perform operations that include receiving a first process graph representation that defines a plurality of process elements and relationships between the plurality of process elements. A second process graph representation is received, where the second process graph representation defines a plurality of reference process elements and relationships between the plurality of reference process elements.

An alignment between the first process graph representation and the second process graph representation is determined using at least one matcher implemented in a first matcher code module. The alignment associates process elements of the first process graph representation with reference process elements of the second process graph representation based on a similarity evaluation. The similarity evaluation is performed at one or more levels of process abstraction.

The alignment is analyzed using at least one process-wide metric implemented in a first metric code module to generate first metric results. The at least one process-wide metric is distinct from similarity evaluations performed at an element level and is computed based on aggregated characteristics of the determined alignment across multiple process elements. The at least one process-wide metric evaluates the alignment across an entirety of the first process graph representation and the second process graph representation, rather than individual element correspondences.

The first metric results are rendered for display via a first user interface. The first metric results include at least a process-wide alignment score indicative of an overall similarity between the first process graph representation and the second process graph representation. At least one alignment parameter is modified based on first user interaction with the displayed first metric results, or an alignment between an element of the first process graph representation and an element of the second process graph representation is modified based on second user interaction with the displayed first metric results.

Example 2 is the computing system of Example 1, where the similarity evaluation is performed at multiple levels of process abstraction.

Example 3 is the computing system of Example 1 or Example 2, where the operations further include rendering a second user interface that displays a plurality of process-wide metrics, where respective process-wide metrics of the plurality are associated with a respective metric code module. A selection of at least one process-wide metric from the plurality of process-wide metrics is received through the second user interface. A metric analysis process is configured to use the first metric code module in analyzing the alignment.

Example 4 is the computing system of any of Examples 1-3, where the operations further include rendering a second user interface that displays a plurality of matcher techniques, where respective matcher techniques of the plurality are associated with a respective matcher code module. A selection of at least one matcher code module is received through the second user interface. A metric analysis process is configured to use the selected matcher code module in analyzing the alignment.

Example 5 is the computing system of any of Examples 1-4, where the first user interaction includes receiving user input accepting or rejecting a processed match between all or a portion of the first process graph representation and all or a portion of the second process graph representation.

Example 6 is the computing system of any of Examples 1-5, where determining an alignment includes generating a first embedding vector for at least one of the first process graph representation and the second process graph representation, or a component thereof, using a first embedding technique. A second embedding vector is generated for a same process graph representation, or a component thereof, using a second embedding technique different from the first embedding technique. The first embedding vector and the second embedding vector are combined to produce a combined embedding vector. The combined embedding vector, or a modified version thereof, is used to analyze alignment between the first process graph representation and the second process graph representation.

Example 7 is the computing system of Example 6, where the operations further include generating the first embedding vector for the first process graph representation or the second process graph representation by encoding a textual representation of a respective graph representation, or a component thereof, using a first embedding technique that processes natural language input. The second embedding vector is generated by encoding a structured representation of the respective process graph representation, or a component thereof, using a second embedding technique that processes graph-based input.

Example 8 is the computing system of Example 6, where the first embedding vector is generated based on a process element of the first process graph representation or the second process graph representation. The second embedding vector is generated based on a parent node of the process element, where the parent node represents a higher-level structural context for the process element within the respective process graph representation.

Example 9 is the computing system of Example 8, where the parent node represents a process category node that corresponds to a classification of the process element within an overarching process model.

Example 10 is the computing system of Example 8, where the parent node represents a containing process node that defines a structured relationship between the process element and a corresponding process workflow.

Example 11 is the computing system of Example 8, where the parent node represents a schema classification node that defines an ontological categorization of the process element within a structured schema model.

Example 12 is the computing system of Example 8, where the parent node represents a functional reference node that defines a structural or operational dependency between the process element and a corresponding reference model component.

Example 13 is the computing system of any of Examples 1-12, where the similarity evaluation is performed at one or more levels selected from a process-level evaluation, where process workflows are compared based on execution structure and dependencies, an activity-level evaluation, where individual process elements are compared based on functional similarity, a schema-level evaluation, where process metadata is compared to determine alignment of structured attributes, or a functional reference-level evaluation, where process elements are compared against predefined reference structures.

Example 14 is one or more computer-readable storage media that include computer-executable instructions. When executed by a computing system that includes at least one hardware processor and at least one memory coupled to the at least one hardware processor, the instructions cause the computing system to receive a dataset comprising a plurality of data elements. The dataset includes at least a first representation and a second representation, where the first representation conveys a first type of semantic information about the dataset and the second representation conveys a second type of semantic information about the dataset that differs from the first type.

A first embedding vector is generated from the first representation using a first embedding technique. A second embedding vector is generated from the second representation using a second embedding technique different from the first embedding technique. The first embedding vector and the second embedding vector are combined to generate a combined embedding vector. The combined embedding vector is processed to determine a similarity measure between the dataset and an input embedding vector corresponding to a search query. Search results are rendered in response to the search query based on the similarity measure.

Example 15 is the one or more computer-readable storage media of Example 14, where the first type of semantic information corresponds to descriptive or contextual attributes of the dataset and the second type of semantic information corresponds to relational or structural characteristics of the dataset.

Example 16 is the one or more computer-readable storage media of Example 14 or Example 15, where the first embedding vector is generated from a natural language text representation of the dataset using a neural language model and the second embedding vector is generated from a structured graph representation of the dataset using a graph embedding technique.

Example 17 is the one or more computer-readable storage media of Example 14 or Example 15, where generating the second embedding vector further includes selecting a parent node corresponding to a data element within the dataset. The parent node represents a higher-level structural or relational context for the data element within the dataset. The second embedding vector is generated based on the parent node.

Example 18 is the one or more computer-readable storage media of any of Examples 14-17, where the operations further include applying a dimensionality reduction technique to the combined embedding vector to generate a reduced embedding vector prior to determining the similarity measure. The dimensionality reduction technique preserves key distinguishing features while improving computational efficiency.

Example 19 is the one or more computer-readable storage media of any of Examples 14-18, where the search query used to determine the similarity measure includes at least one of a single data element, a subset of data elements from another dataset, or an entire dataset representation.

Example 20 is a method implemented in a computing system that includes at least one hardware processor and at least one memory coupled to the at least one hardware processor. The method includes receiving a first process graph representation that defines a plurality of process elements and relationships between the plurality of process elements. A second process graph representation is received, where the second process graph representation defines a plurality of reference process elements and relationships between the plurality of reference process elements.

An alignment between the first process graph representation and the second process graph representation is determined using at least one matcher implemented in a first matcher code module. The alignment associates process elements of the first process graph representation with reference process elements of the second process graph representation based on a similarity evaluation. The similarity evaluation is performed at one or more levels of process abstraction.

The alignment is analyzed using at least one process-wide metric implemented in a first metric code module to generate first metric results. The at least one process-wide metric is distinct from similarity evaluations performed at an element level and is computed based on aggregated characteristics of the determined alignment across multiple process elements. The at least one process-wide metric evaluates the alignment across an entirety of the first process graph representation and the second process graph representation, rather than individual element correspondences. The first metric results are rendered for display via a first user interface. The first metric results include at least a process-wide alignment score indicative of an overall similarity between the first process graph representation and the second process graph representation.

At least one alignment parameter is modified based on first user interaction with the displayed first metric results, or an alignment between an element of the first process graph representation and an element of the second process graph representation is modified based on second user interaction with the displayed first metric results.

Example 8—Computing Systems

Figure 13:
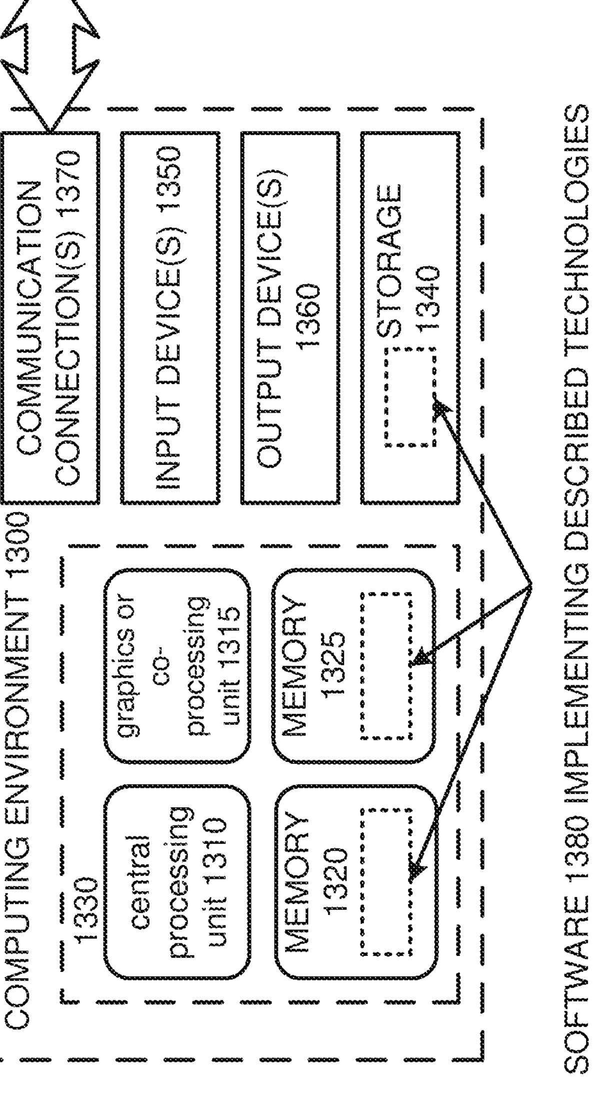
FIG. 13 is a diagram of an example computing environment in which disclosed techniques can be implemented.

FIG. 13 depicts a generalized example of a suitable computing system 1300 in which the described innovations may be implemented. The computing system 1300 is not intended to suggest any limitation as to scope of use or functionality of the present disclosure, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing technologies described in Examples 1-17. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s)

1310, 1315. The memory 1320, 1325 stores software 1380 implementing one or more innovations described herein, in the form of computer-executable instructions suitable for execution by the processing unit(s) 1310, 1315.

A computing system 1300 may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way, and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9—Cloud Computing Environment

Figure 14:
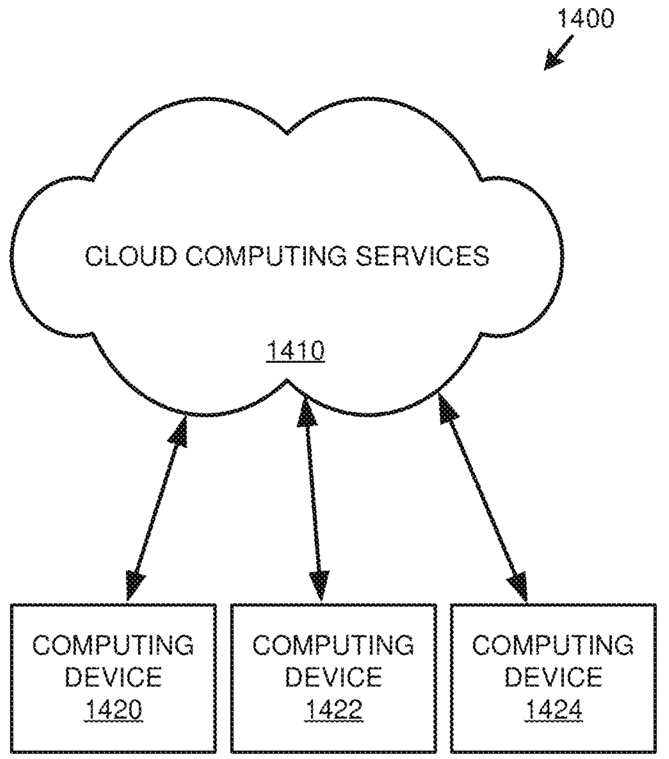
FIG. 14 is an example cloud computing environment that can be used in conjunction with the technologies described herein.

FIG. 14 depicts an example cloud computing environment 1400 in which the described technologies can be implemented. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operators (e.g., data processing, data storage, and the like).

Example 10—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 13, computer-readable storage media include memory 1320 and 1325, and storage 1340. The term computer-readable storage media does not include signals and carrier waves. In addition, the term computer-readable storage media does not include communication connections (e.g., 1370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, R, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:

at least one hardware processor;

at least one memory coupled to the at least one hardware processor; and one or more computer-readable storage media comprising computer-executable instructions that, when executed, cause the computing system to perform operations comprising:

receiving a first process graph representation, the first process graph representation defining a plurality of process elements and relationships between the plurality of process elements;

receiving a second process graph representation, the second process graph representation defining a plurality of reference process elements and relationships between the plurality of reference process elements;

determining an alignment between the first process graph representation and the second process graph representation with at least one matcher implemented in a first matcher code module, wherein the alignment associates process elements of the first process graph representation with reference process elements of the second process graph representation based on a similarity evaluation, the similarity evaluation being performed at one or more levels of process abstraction;

analyzing the alignment using at least one process-wide metric implemented in a first metric code module to generate first metric results, wherein the at least one process-wide metric is distinct from similarity evaluations performed at an element level and is computed based on aggregated characteristics of the determined alignment across multiple process elements, wherein the at least one process-wide metric evaluates the alignment across an entirety of the first process graph representation and the second process graph representation, rather than individual element correspondences;

rendering the first metric results for display via a first user interface, the first metric results including at least a process-wide alignment score indicative of an overall similarity between the first process graph representation and the second process graph representation; and;

(1) modifying at least one alignment parameter based on first user interaction with the displayed first metric results; or (2) modifying an alignment between an element of the first process graph representation and an element of the second process graph representation based in second user interaction with the displayed first metric results.

2. The computing system of claim 1, wherein the similarity evaluation is performed at multiple levels of process abstraction.

3. The computing system of claim 1, the operations further comprising:

rendering a second user interface displaying a plurality of process-wide metrics, respective process-wide metrics of the plurality of process-wide metrics being associated with a respective metric code module;

receiving through the second user interface a selection of the at least one process-wide metric from the plurality of process-wide metrics; and configuring a metric analysis process to use the first metric code module in analyzing the alignment.

4. The computing system of claim 1, the operations further comprising:

rendering a second user interface displaying a plurality of matcher techniques, respective matcher techniques of the plurality of matcher techniques being associated with a respective matcher code module;

receiving through the second user interface a selection of the at least one matcher code module; and configuring a metric analysis process to use the at least one matcher code module in analyzing the alignment.

5. The computing system of claim 1, wherein the first user interaction comprises receiving user input accepting or rejecting a processed match between all or a portion of the first process graph representation and all or a portion of the second process graph representation.

6. The computing system of claim 1, wherein determining an alignment comprises:

generating a first embedding vector for at least one of the first process graph representation and the second process graph representation, or a component thereof, using a first embedding technique;

generating a second embedding vector for a same process graph representation, or a component thereof, using a second embedding technique different from the first embedding technique;

combining the first embedding vector and the second embedding vector to produce a combined embedding vector; and using the combined embedding vector, or a modified version thereof, to analyze alignment between the first process graph representation and the second process graph representation.

7. The computing system of claim 6, the operations further comprising:

generating the first embedding vector for the first process graph representation or the second process graph representation by encoding a textual representation of a respective graph representation, or a component thereof, using a first embedding technique that processes natural language input; and generating the second embedding vector by encoding a structured representation of the respective process graph representation, or a component thereof, using a second embedding technique that processes graph-based input.

8. The computing system of claim 6, wherein:

generating the first embedding vector based on a process element of the first process graph representation or the second process graph representation; and generating the second embedding vector based on a parent node of the process element, the parent node representing a higher-level structural context for the process element within the respective process graph representation.

9. The computing system of claim 8, wherein:

the parent node represents a process category node that corresponds to a classification of the process element within an overarching process model.

10. The computing system of claim 8, wherein:

the parent node represents a containing process node that defines a structured relationship between the process element and a corresponding process workflow.

11. The computing system of claim 8, wherein:

the parent node represents a schema classification node that defines an ontological categorization of the process element within a structured schema model.

12. The computing system of claim 8, wherein:

the parent node represents a functional reference node that defines a structural or operational dependency between the process element and a corresponding reference model component.

13. The computing system of claim 1, wherein:

the similarity evaluation is performed at one or more levels selected from:

a process-level evaluation, wherein process workflows are compared based on execution structure and dependencies;

an activity-level evaluation, wherein individual process elements are compared based on functional similarity;

a schema-level evaluation, wherein process metadata is compared to determine alignment of structured attributes; or a functional reference-level evaluation, wherein process elements are compared against predefined reference structures.

14. One or more computer-readable storage media comprising:

computer-executable instructions that, when executed by a computing system comprising at least one hardware processor and at least one memory coupled to the at least one hardware process, cause the computing system to receive a dataset comprising a plurality of data elements, the dataset having at least a first representation and a second representation, wherein the first representation conveys a first type of semantic information about the dataset, and the second representation conveys a second type of semantic information about the dataset that differs from the first type;

computer-executable instructions that, when executed by the computing system, cause the computing system to generate a first embedding vector from the first representation using a first embedding technique;

computer-executable instructions that, when executed by the computing system, cause the computing system to generate a second embedding vector from the second representation using a second embedding technique different from the first embedding technique;

computer-executable instructions that, when executed by the computing system, cause the computing system to generate a unified embedding vector based on both the first embedding vector and the second embedding vector;

computer-executable instructions that, when executed by the computing system, cause the computing system to process the unified embedding vector to determine a similarity measure between the dataset and an input embedding vector corresponding to a search query;

analyzing an alignment between the first data set and a second data set, provided as search criteria, using the unified embedding vector, or a modified version thereof, and an embedding vector for the second data set; and computer-executable instructions that, when executed by the computing system, cause the computing system to return search results in response to the search query based on the similarity measure.

15. The one or more computer-readable storage media of claim 14, wherein:

(1) the first type of semantic information corresponds to descriptive or contextual attributes of the dataset; and (2) the second type of semantic information corresponds to relational or structural characteristics of the dataset.

16. The one or more computer-readable storage media of claim 14, wherein:

(1) the first embedding vector is generated from a natural language text representation of the dataset using a neural language model; and (2) the second embedding vector is generated from a structured graph representation of the dataset using a graph embedding technique.

17. The one or more computer-readable storage media of claim 14, wherein:

(1) generating the second embedding vector further comprises selecting a parent node corresponding to a data element within the dataset, the parent node representing a higher-level structural or relational context for the data element within the dataset; and (2) the second embedding vector is generated based on the parent node.

18. The one or more computer-readable storage media of claim 14, further comprising:

computer-executable instructions that, when executed by the computing system, cause the computing system to apply a dimensionality reduction technique to the unified embedding vector to generate a reduced embedding vector prior to determining the similarity measure, wherein the dimensionality reduction technique preserves key distinguishing features while improving computational efficiency.

19. The one or more computer-readable storage media of claim 14, wherein the search query used to determine the similarity measure comprises at least one of:

(1) a single data element;

(2) a subset of data elements from another dataset; or (3) an entire dataset representation.

20. A method, implemented in a computing system comprising at least one hardware processor and at least one memory coupled to the at least one hardware processor, the method comprising:

receiving a first process graph representation, the first process graph representation defining a plurality of process elements and relationships between the plurality of process elements;

receiving a second process graph representation, the second process graph representation defining a plurality of reference process elements and relationships between the plurality of reference process elements;

determining an alignment between the first process graph representation and the second process graph representation with at least one matcher implemented in a first matcher code module, wherein the alignment associates process elements of the first process graph representation with reference process elements of the second process graph representation based on a similarity evaluation, the similarity evaluation being performed at one or more levels of process abstraction;

analyzing the alignment using at least one process-wide metric implemented in a first metric code module to generate first metric results, wherein the at least one process-wide metric is distinct from similarity evaluations performed at an element level and is computed based on aggregated characteristics of the determined alignment across multiple process elements, wherein the at least one process-wide metric evaluates the alignment across an entirety of the first process graph representation and the second process graph representation, rather than individual element correspondences;

rendering the first metric results for display via a first user interface, the first metric results including at least a process-wide alignment score indicative of an overall similarity between the first process graph representation and the second process graph representation; and (1) modifying at least one alignment parameter based on first user interaction with the displayed first metric results; or (2) modifying an alignment between an element of the first process graph representation and an element of the second process graph representation based in second user interaction with the displayed first metric results.

* * * * *